United States Patent
Li et al.

(10) Patent No.: US 9,691,357 B2
(45) Date of Patent: Jun. 27, 2017

(54) INFORMATION PROCESSING METHOD AND ELECTRONIC DEVICE THEREOF, IMAGE CALIBRATION METHOD AND APPARATUS, AND ELECTRONIC DEVICE THEREOF

(71) Applicant: Lenovo (Beijing) Co., Ltd., Beijing (CN)

(72) Inventors: Xiang Li, Beijing (CN); Jun Ma, Beijing (CN); Jing Zhang, Beijing (CN); Xingming Yu, Beijing (CN); Yunkai Chen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 76 days.

(21) Appl. No.: 14/451,977

(22) Filed: Aug. 5, 2014

(65) Prior Publication Data
US 2015/0042559 A1  Feb. 12, 2015

(30) Foreign Application Priority Data

Aug. 9, 2013  (CN) .......................... 2013 1 0347516
Nov. 18, 2013  (CN) .......................... 2013 1 0578185

(51) Int. Cl.
*G09G 5/12*  (2006.01)
*G06F 3/00*  (2006.01)
*G06F 3/14*  (2006.01)

(52) U.S. Cl.
CPC ............... *G09G 5/12* (2013.01); *G06F 3/005* (2013.01); *G06F 3/1438* (2013.01); *G09G 2320/0693* (2013.01); *G09G 2354/00* (2013.01)

(58) Field of Classification Search
CPC ....... G06F 3/1438; G06F 3/005; G06T 7/002; G09G 5/12; G09G 2320/0693; G09G 2354/00
(Continued)

(56) References Cited

U.S. PATENT DOCUMENTS 7,334,899 B2  2/2008  Kobayashi
7,470,029 B2  12/2008  Kobayashi
(Continued)

FOREIGN PATENT DOCUMENTS

CN  1577050 A  2/2005
CN  1601368 A  3/2005
(Continued)

OTHER PUBLICATIONS

First Chinese Office Action regarding Application No. 201310347516.9 dated Jan. 22, 2017. English translation provided by Unitalen Attorneys at Law.

*Primary Examiner* — Amare Mengistu
*Assistant Examiner* — Gloryvid Figueroa-Gibson
(74) *Attorney, Agent, or Firm* — Harness, Dickey & Pierce, P.L.C.

(57) ABSTRACT

An information processing method applied to an electronic device is provided. The electronic device can make first multimedia data displayed synchronously on a first display unit and a second display unit. The method includes: acquiring a first parameter of the first display unit and a second parameter of the second display unit; acquiring a first operation on the first multimedia data for the second display unit; analyzing the first operation to obtain first coordinates of the first operation; transforming, based on the first parameter and the second parameter, the first coordinates of the first operation into second coordinates of the first operation on the first multimedia data for the first display unit; and (Continued)

performing the first operation based on the second coordinates of the first operation.

5 Claims, 15 Drawing Sheets

(58) Field of Classification Search
USPC .................................. 345/156–184, 1.1–3.4
See application file for complete search history.

(56) References Cited

U.S. PATENT DOCUMENTS

| | | | |
|---|---|---|---|
| 8,794,768 B2 | 8/2014 | Ozawa | |
| 9,147,247 B2 | 9/2015 | Takabayashi | |
| 9,494,846 B2 | 11/2016 | Ozawa | |
| 2005/0036117 A1 | 2/2005 | Kobayashi | |
| 2005/0094108 A1 | 5/2005 | Kobayashi | |
| 2006/0158425 A1 | 7/2006 | Andrews et al. | |
| 2010/0188355 A1* | 7/2010 | Sugita | G06F 3/0418 345/173 |
| 2012/0105816 A1 | 5/2012 | Ozawa | |
| 2013/0046506 A1 | 2/2013 | Takabayashi | |
| 2013/0057493 A1* | 3/2013 | Hwang | G06F 3/0418 345/173 |
| 2013/0162607 A1* | 6/2013 | Ichieda | G06F 3/0425 345/204 |
| 2014/0055401 A1* | 2/2014 | Ye | G06F 3/041 345/173 |
| 2014/0306890 A1 | 10/2014 | Ozawa | |
| 2016/0077605 A1* | 3/2016 | Chen | G06F 3/1423 345/157 |
| 2016/0188275 A1* | 6/2016 | Huang | G06F 3/1423 715/761 |

FOREIGN PATENT DOCUMENTS

| | | |
|---|---|---|
| CN | 102221887 A | 10/2011 |
| CN | 102455575 A | 5/2012 |
| CN | 102708566 A | 10/2012 |
| CN | 102954770 A | 3/2013 |

\* cited by examiner

INFORMATION PROCESSING METHOD AND ELECTRONIC DEVICE THEREOF, IMAGE CALIBRATION METHOD AND APPARATUS, AND ELECTRONIC DEVICE THEREOF

The present application claims the priority to Chinese Patent Application No. 201310578185.X, entitled as "INFORMATION PROCESSING METHOD AND ELECTRONIC DEVICE", filed on Nov. 18, 2013 with Chinese State Intellectual Property Office, and the priority to Chinese Patent Application No. 201310347516.9, entitled as "IMAGE CALIBRATION METHOD AND APPARATUS, AND ELECTRONIC DEVICE", filed on Aug. 9, 2013 with Chinese State Intellectual Property Office, which are incorporated herein by reference in their entirety.

FIELD

The disclosure relates to the filed of information processing and image calibration, and particularly to an information processing method and an electronic device, and an image calibration method and apparatus and an electronic device.

BACKGROUND

As development of smart phones, it is more and more popular to realize one machine with multiple screens and display content sharing among multiple screens using a phone microcast technology and a wifi display technology. However, in this case, touch operation can only be performed on the display content in the host screen, and content in the extended screen or in the shared screen by wifi display is changed as the content in the host screen and can not be performed by a user directly. An input operation on the extended screen can be realized with the advent of gesture input operation or extension device such as a Bluetooth mouse and a Bluetooth keypad. However, the content of the extended screen is only a mirror content of the host screen, and the host screen can not process and respond to the input operation on the extended screen since different display screens has different display resolutions.

In addition, in displaying by a projector on a projection plane, a relative position of a projection region of the projector in a recognition region of a camera is required to be calibrated. The image calibration process may be as follows. Alignment patterns such as crosses are projected onto four corners of the recognition region of the camera, and the user clicks the crosses on the four corners. The recognition region responds to the click operation to obtain coordinates of four apexes of the projection region in the recognition region, and the four apexes are used to calibrate the relative position of the projection region in the recognition region. It can be seen that the existing image calibration process requires user's operation to calibrate the relative position between the two regions.

SUMMARY

The disclosure provides an information processing method and an electronic device, which enable the host screen to process and respond to the input operation on the extended screen, to improve user experience.

An information processing method is provided, which is applied to an electronic device, the electronic device is capable of making first multimedia data displayed synchronously on a first display unit and a second display unit and the first display unit is located in the electronic device; the method includes:

acquiring a first parameter of the first display unit and a second parameter of the second display unit;

acquiring a first operation on the first multimedia data for the second display unit;

analyzing the first operation to obtain first coordinates of the first operation;

transforming, based on the first parameter and the second parameter, the first coordinates of the first operation on the first multimedia data for the second display unit into second coordinates of the first operation on the first multimedia data for the first display unit; and performing the first operation based on the second coordinates of the first operation.

An electronic device is provided, where the electronic device is capable of making first multimedia data displayed synchronously on a first display unit and a second display unit and the first display unit is located in the electronic device; the electronic device includes a first acquiring unit, a second acquiring unit, an analyzing unit, a first transforming unit and a first execution unit, the first acquiring unit is configured to acquire a first parameter of the first display unit and a second parameter of the second display unit;

the second acquiring unit is configured to acquire a first operation on the first multimedia data for the second display unit;

the analyzing unit is configured to analyze the first operation to obtain first coordinates of the first operation;

the first transforming unit is configured to transform, based on the first parameter and the second parameter, the first coordinates of the first operation on the first multimedia data for the second display unit into second coordinates of the first operation on the first multimedia data for the first display unit; and the first execution unit is configured to perform the first operation based on the second coordinates of the first operation.

In the technical solution of the disclosure, the first parameter of the first display unit and the second parameter of the second display unit are acquired, the first coordinates of the first operation for the second display unit is transformed into the second coordinates of the first operation for the first display unit based on the first parameter and the second parameter, and the first operation is performed based on the second coordinates of the first operation. In this way, in a case that the resolutions of the extended screen and the host screen are different from each other, the input operation for the extended screen can be synchronized between the extended screen and the host screen, and the host screen can process and respond to the input operation on the extended screen, thus improving the user experience.

The disclosure further provides an image calibration method, an image calibration apparatus and an electronic device, which can address the problem that the existing image calibration process requires user's operation to calibrate the relative position of the projection region in the recognition region.

An image calibration method is provided, which is applied to an electronic device, the electronic device includes a micro projector and a depth camera and a relative position between the micro projector and the depth camera is fixed; the method includes:

acquiring a depth image formed by the depth camera on a projection plane, wherein the projection plane is a plane that the depth camera irradiates and the micro projector projects a light beam on; and obtaining a relative position of a projection region in the depth image based on the relative position between the micro projector and the depth camera, wherein the projection region is a region formed by the micro projector on the projection plane.

An image calibration apparatus is further provided, which is applied to an electronic device, the electronic device includes a micro projector and a depth camera and a relative position between the micro projector and the depth camera is fixed; the apparatus includes:

an acquisition unit configured to acquire a depth image formed by the depth camera on a projection plane, wherein the projection plane is a plane that the depth camera irradiates and the micro projector projects a light beam on; and a position obtaining unit configured to obtain a relative position of a projection region in the depth image based on the relative position between the micro projector and the depth camera, wherein the projection region is a region formed by the micro projector on the projection plane.

An electronic device is further provided, including a micro projector, a depth camera and the image calibration apparatus described above, where a relative position between the micro projector and the depth camera is fixed, and the image calibration apparatus is configured to calibrate a relative position of a projection region of the micro projector in a depth image of the depth camera.

In the technical solution of the disclosure, a depth image formed by the depth camera on a projection plane is acquired, and then a relative position of a projection region in the depth image is obtained based on the relative position between the micro projector and the depth camera, thus the relative position of the projection region in the depth image is calibrated automatically. Compared with the conventional condition, in a case that the micro projector or the projection plane is changed, the relative position of the projection region in the depth image can be obtained based on the relative position between the micro projector and the depth camera, without the user's operation to re-calibrate the relative position, thus speeding up the calibration and increasing efficiency.

DETAILED DESCRIPTION

In order to better understand features and technical content of the disclosure, the disclosure will be explained in detail below in conjunction with drawings, and the drawings are only used for illustration and are not intended to limit the disclosure.

Figure 1:
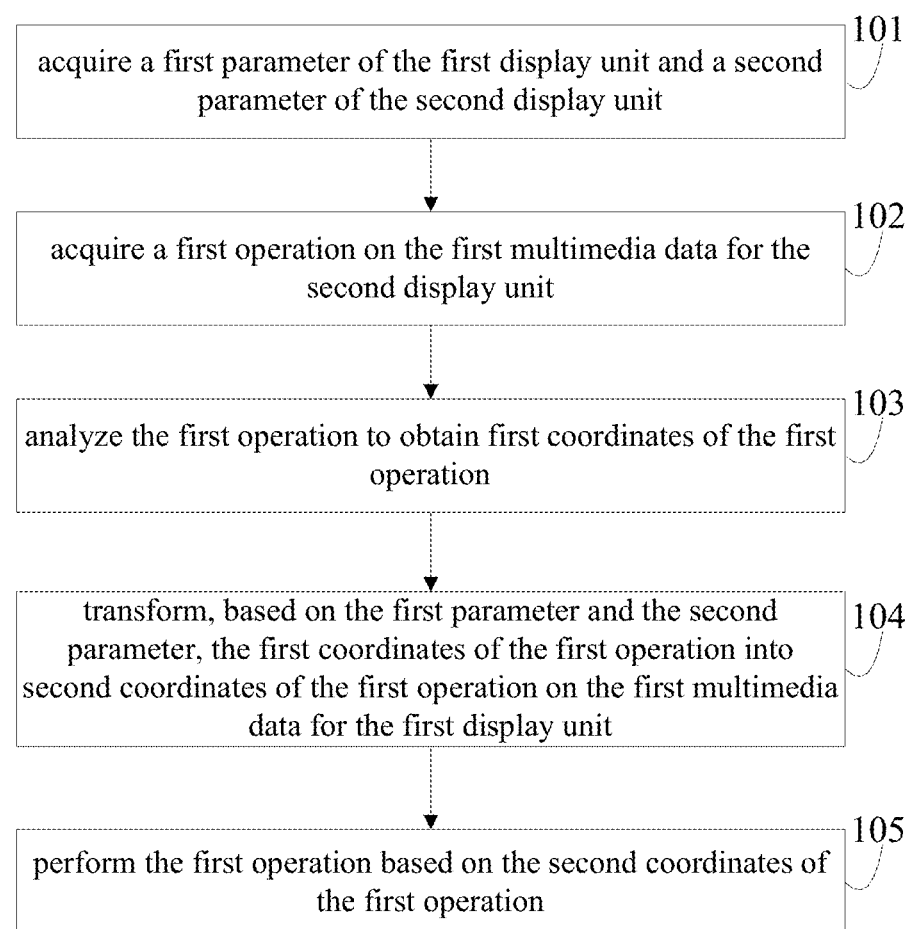
FIG. 1 is a schematic flowchart of an information processing method according to an embodiment of the disclosure.

FIG. 1 is a schematic flowchart of an information processing method according to an embodiment of the disclosure. The information processing method in the embodiment is applied to an electronic device, and the electronic device is capable of making first multimedia data displayed synchronously on a first display unit and a second display unit and the first display unit is located in the electronic device. In a preferred embodiment of the disclosure, the information processing method includes steps 101 to 105.

In step 101, a first parameter of the first display unit and a second parameter of the second display unit are acquired.

In the embodiment, the first display unit is a display apparatus in the electronic device, such as a touch display screen, and the first display unit is a host screen. The first parameter of the first display unit is screen resolution of the first display unit. The second display unit is an extended screen. The second display unit may be a projection unit using a microcast technology or may be a display apparatus using a wifi display technology. The second parameter of the second display unit is screen resolution of the second display unit.

Since the first display unit is located in the electronic device, the first parameter of the first display unit may be acquired directly. In a case that the second display unit is a projection unit using the microcast technology, the second display unit is also located in the electronic device, and thus the second parameter of the second display unit may also be acquired directly. In a case that the second display unit is a display apparatus using the wifi display technology, the second display unit is independent of the electronic device, and the second display unit interacts with the electronic device via a wifi network, therefore, the electronic device may acquire the second parameter of the second display unit via the wifi network.

The first multimedia data in the embodiment is multimedia data displayed on a desktop of the electronic device. For example, the first multimedia data is video data in a case that a video is played on the desktop in a full screen mode.

In step 102, a first operation on the first multimedia data for the second display unit is acquired.

A user may operate on the first multimedia data for the second display unit, which refers to as the first operation. For example, in a case that the second display unit is a touch display screen, the user may touch the second display unit to interact with the first multimedia data.

In order to enable the electronic device in the embodiment to process and respond to the first operation, the electronic device needs to acquire the first operation on the first multimedia data for the second display unit. In a case that the second display unit is a projection unit using the microcast technology, the electronic device may acquire the first operation by deep detection. In a case that the second display unit is a display apparatus using the wifi display technology, the second display unit is independent of the electronic device, and the second display unit interacts with the electronic device via a wifi network, therefore, the electronic device may acquire the first operation via the wifi network.

The first operation may be, for example, a touch operation, a key operation, a gesture operation or a voice operation.

In step 103, the first operation is analyzed, to obtain first coordinates of the first operation.

The first operation herein corresponds to coordinate information, and the coordinate information is position information of the first operation in the second display unit. Therefore, the first coordinates are coordinates of the first operation in the second display unit.

In step 104, the first coordinates of the first operation are transformed based on the first parameter and the second parameter, to obtain second coordinates of the first operation on the first multimedia data for the first display unit.

The first coordinates of the first operation herein are two-dimensional coordinates, for example, x1 coordinate and y1 coordinate. The x1 coordinate and the y1 coordinate are transformed respectively based on the first parameter and the second parameter, to obtain x2 coordinate and y2 coordinate. The x2 coordinate and y2 coordinate are the second coordinates of the first operation. The second coordinates are coordinates of the first operation in the first display unit.

In step 105, the first operation is performed based on the second coordinates of the first operation.

Since the second coordinates of the first operation are coordinates in the first display unit, the electronic device can process and respond to the first operation.

Figure 2:
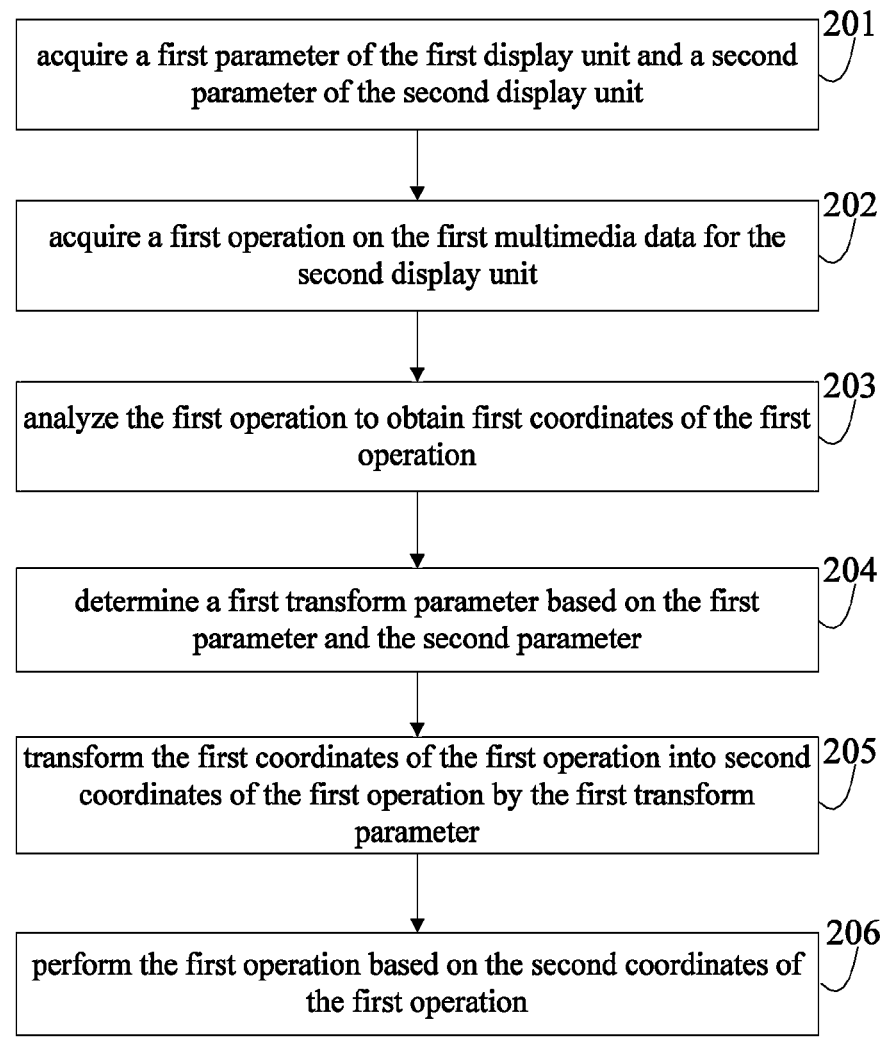
FIG. 2 is a schematic flowchart of an information processing method according to an embodiment of the disclosure.

FIG. 2 is a schematic flowchart of an information processing method according to an embodiment of the disclosure. The information processing method in the embodiment is applied to an electronic device, and the electronic device is capable of making first multimedia data displayed synchronously on a first display unit and a second display unit. The first multimedia data is displayed on the first display unit and the second display unit in a full screen mode. The first display unit is located in the electronic device. In a preferred embodiment of the disclosure, the information processing method includes steps 201 to 206.

In step 201, a first parameter of the first display unit and a second parameter of the second display unit are acquired.

In the embodiment, the first display unit is a display apparatus in the electronic device, such as a touch display screen, and the first display unit is a host screen. The first parameter of the first display unit is screen resolution of the first display unit. The second display unit is an extended screen. The second display unit may be a projection unit using a microcast technology or may be a display apparatus using a wifi display technology. The second parameter of the second display unit is screen resolution of the second display unit.

Since the first display unit is located in the electronic device, the first parameter of the first display unit may be acquired directly. In a case that the second display unit is a projection unit using the microcast technology, the second display unit is also located in the electronic device, and thus the second parameter of the second display unit may also be acquired directly. In a case that the second display unit is a display apparatus using the wifi display technology, the second display unit is independent of the electronic device, and the second display unit interacts with the electronic device via a wifi network, therefore, the electronic device may acquire the second parameter of the second display unit via the wifi network.

The first multimedia data in the embodiment is multimedia data displayed on a desktop of the electronic device. For example, the first multimedia data is video data in a case that a video is played on the desktop in a full screen mode.

In step 202, a first operation on the first multimedia data for the second display unit is acquired.

A user may operate on the first multimedia data for the second display unit, which refers to as the first operation. For example, in a case that the second display unit is a touch display screen, the user may touch the second display unit to interact with the first multimedia data.

In order to enable the electronic device in the embodiment to process and respond to the first operation, the electronic device needs to acquire the first operation on the first multimedia data for the second display unit. In a case that the second display unit is a projection unit using the microcast technology, the electronic device may acquire the first operation by deep detection. In a case that the second display unit is a display apparatus using the wifi display technology, the second display unit is independent of the electronic device, and the second display unit interacts with the electronic device via a wifi network, therefore, the electronic device may acquire the first operation via the wifi network.

The first operation may be, for example, a touch operation, a key operation, a gesture operation or a voice operation.

In step 203, the first operation is analyzed, to obtain first coordinates of the first operation.

The first operation herein corresponds to coordinate information, and the coordinate information is position information of the first operation in the second display unit. Therefore, the first coordinates are coordinates of the first operation in the second display unit.

In step 204, a first transform parameter is determined based on the first parameter and the second parameter.

Since the first multimedia data is displayed on the first display unit and the second display unit in a full screen mode, the first transform parameter may be determined directly based on the first parameter and the second parameter. Specifically, provided that screen resolution of the second display unit is M×N and screen resolution of the first display unit is P×Q, the first transform parameter is P×M and Q×N.

In step 205, the first coordinates of the first operation are transformed by the first transform parameter, to obtain second coordinates of the first operation.

Specifically, provided that the first coordinates of the first operation are $(x_1, y_1)$, second coordinates $(x_2, y_2)$ are obtained by transforming the first coordinates by the first transform parameter. The process of transforming the first coordinates of the first operation by the first transform parameter may be realized by the following formula (1):

$$x_2 = P \times M / x_1$$

$$y_2 = Q \times N / y_1 \quad (1)$$

The second coordinates herein are coordinates of the first operation in the first display unit.

In step 206, the first operation is performed based on the second coordinates of the first operation.

Since the second coordinates of the first operation are coordinates in the first display unit, the electronic device can process and respond to the first operation.

Figure 3:
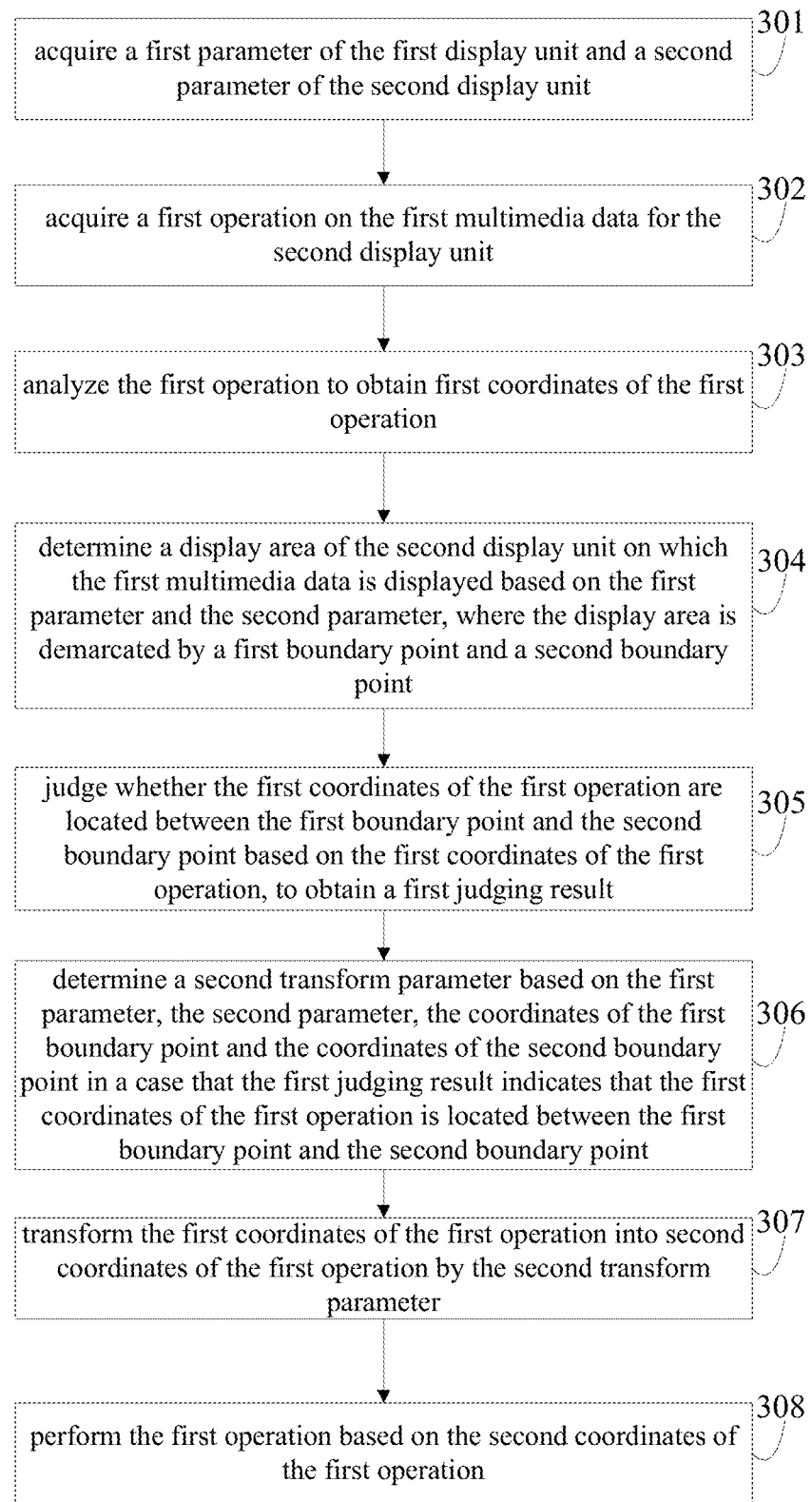
FIG. 3 is a schematic flowchart of an information processing method according to an embodiment of the disclosure.

FIG. 3 is a schematic flowchart of an information processing method according to an embodiment of the disclosure. The information processing method in the embodiment is applied to an electronic device, and the electronic device is capable of making first multimedia data displayed synchronously on a first display unit and a second display unit. The first multimedia data is displayed on the first display unit in a full screen mode and is displayed on the second display unit in a non-full screen mode. The first display unit is located in the electronic device. In a preferred embodiment of the disclosure, the information processing method includes steps 301 to 308.

In step 301, a first parameter of the first display unit and a second parameter of the second display unit are acquired.

In the embodiment, the first display unit is a display apparatus in the electronic device, such as a touch display screen, and the first display unit is a host screen. The first parameter of the first display unit is screen resolution of the first display unit. The second display unit is an extended screen. The second display unit may be a projection unit using a microcast technology or may be a display apparatus using a wifi display technology. The second parameter of the second display unit is screen resolution of the second display unit.

Since the first display unit is located in the electronic device, the first parameter of the first display unit may be acquired directly. In a case that the second display unit is a projection unit using the microcast technology, the second display unit is also located in the electronic device, and thus the second parameter of the second display unit may also be acquired directly. In a case that the second display unit is a display apparatus using the wifi display technology, the second display unit is independent of the electronic device, and the second display unit interacts with the electronic device via a wifi network, therefore, the electronic device may acquire the second parameter of the second display unit via the wifi network.

The first multimedia data in the embodiment is multimedia data displayed on a desktop of the electronic device. For example, the first multimedia data is video data in a case that a video is played on the desktop in a full screen mode.

In step 302, a first operation on the first multimedia data for the second display unit is acquired.

A user may operate on the first multimedia data for the second display unit, which refers to as the first operation. For example, in a case that the second display unit is a touch display screen, the user may touch the second display unit to interact with the first multimedia data.

In order to enable the electronic device in the embodiment to process and respond to the first operation, the electronic device needs to acquire the first operation on the first multimedia data for the second display unit. In a case that the second display unit is a projection unit using the microcast technology, the electronic device may acquire the first operation by deep detection. In a case that the second display unit is a display apparatus using the wifi display technology, the second display unit is independent of the electronic device, and the second display unit interacts with the electronic device via a wifi network, therefore, the electronic device may acquire the first operation via the wifi network.

The first operation may be, for example, a touch operation, a key operation, a gesture operation or a voice operation.

In step 303, the first operation is analyzed, to obtain first coordinates of the first operation.

The first operation herein corresponds to coordinate information, and the coordinate information is position information of the first operation in the second display unit. Therefore, the first coordinates are coordinates of the first operation in the second display unit.

In step 304, a display area of the second display unit on which the first multimedia data is displayed is determined based on the first parameter and the second parameter, where the display area is demarcated by a first boundary point and a second boundary point.

Figure 11:
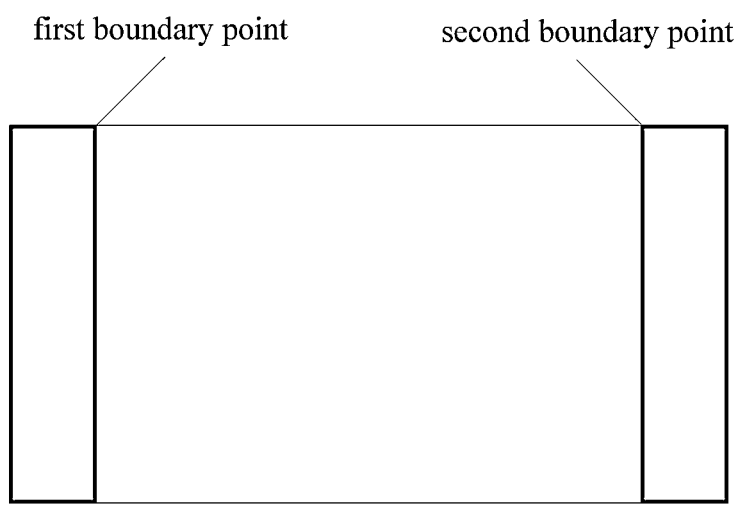
FIG. 11 is a schematic diagram of a second display unit displaying first multimedia data in a portrait mode according to an embodiment of the disclosure.

Whether the first multimedia data is displayed on the second display unit in a portrait mode or in a landscape mode needs to be considered in a case that the first multimedia data is displayed on the second display unit in a non-full screen mode. Reference is made to FIG. 11 which is a schematic diagram of a second display unit displaying the first multimedia data in a portrait mode, where the second display unit is a projection unit, the shadow areas represent areas in which the first multimedia data is not displayed and the white area represents an area in which the first multimedia data is displayed. Provided that the width of the left shadow area is D1, the width of the right shadow area is D2, and the width of the whole projection plane is D; the first boundary point represents a boundary between the left shadow area and the white area, and coordinates of the first boundary point are (X1,0), the second boundary point represents a boundary between the right shadow area and the white area, and coordinates of the second boundary point are (X2,0); x coordinate of the first boundary point may be determined by the following formula (2) and x coordinate of the second boundary point may be determined by the following formula (3):

$$X1 = M \times D1 / D \quad (2)$$

$$X2 = M \times (D - D2) / D \quad (3)$$

where the relationship between D and D1 and between D and D2 may be obtained by following steps.

Provided that the height of the white area is H and the width of the white area is W, formula (4) is obtained by H/W=N/M and H/D=P/Q:

$$W = (P \times M \times D)/(Q \times N) \quad (4)$$

Since W=D1+D2+D3. D1 may be obtained by the following formula (5) if D1=D2:

$$D1 = \{(P \times M \times D)/(Q \times N) - D\}/2 \quad (5)$$

By substituting formula (5) into formula (2) and formula (3), x coordinate of the first boundary point and x coordinate of the second boundary point in the portrait mode are obtained, as shown in formula (6) and formula (7):

$$X1 = M \times \{(P \times M)/(Q \times N) - 1\}/2 \quad (6)$$

$$X2 = M \times [1 - \{(P \times M)/(Q \times N) - 1\}]/2 \quad (7)$$

In this way, the first boundary point and the second boundary point are determined based on the first parameter and the second parameter, and the display area of the second display unit on which the first multimedia data is displayed is further determined.

Figure 12:
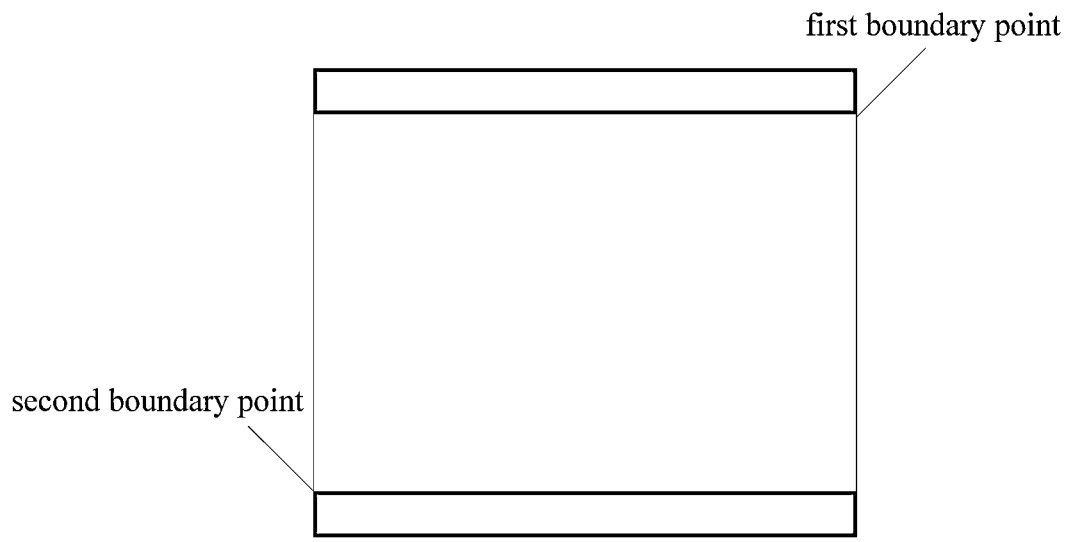
FIG. 12 is a schematic diagram of a second display unit displaying first multimedia data in a landscape mode according to an embodiment of the disclosure.

Reference is made to FIG. 12 which is a schematic diagram of a second display unit displaying the first multimedia data in a landscape mode, where the second display unit is a projection unit, the shadow areas represent areas in which the first multimedia data is not displayed and the white area represents an area in which the first multimedia data is displayed. Provided that the height of the upper shadow area is H1, the height of the lower shadow area is H2, and the height of the whole projection plane is H; the first boundary point represents a boundary between the upper shadow area and the white area, and coordinates of the first boundary point are (0,Y1), the second boundary point represents a boundary between the lower shadow area and the white area, and coordinates of the second boundary point are (0,Y2); y coordinate of the first boundary point may be determined by the following formula (8), and y coordinate of the second boundary point may be determined by the following formula (9):

$$Y1 = N \times H1/H \quad (8)$$

$$Y2 = N \times (H - H2)/H \quad (9)$$

where, similar as conditions in the portrait mode, the relationship between H and H1 and between H and H2 may be obtained by following formula (10):

$$H1 = H2 = \{(P \times N \times H)/(Q \times M) - H\}/2 \quad (10)$$

By substituting formula (10) into formula (8) and formula (9), y coordinate of the first boundary point and y coordinate of the second boundary point in the landscape mode are obtained, as shown in formula (11) and formula (12):

$$Y1 = N \times \{(P \times N)/(Q \times M) - 1\}/2 \quad (11)$$

$$Y2 = N \times [1 - \{(P \times N)/(Q \times M) - 1\}]/2 \quad (12)$$

In this way, the first boundary point and the second boundary point are determined based on the first parameter and the second parameter, and the display area of the second display unit on which the first multimedia data is displayed is further determined.

In step 305, it is judged whether the first coordinates of the first operation are located between the first boundary point and the second boundary point based on the first coordinates of the first operation, to obtain a first judging result.

Provided that the first coordinates of the first operation are $(x_1, y_1)$, the process of judging whether the first coordinates of the first operation are located between the first boundary point and the second boundary point may be as follows.

In a case that the first multimedia data is displayed on the second display unit in aa portrait mode, it is judged whether formula (13) holds.

$$X1 \leq x_1 \leq X2 \quad (13)$$

In a case that formula (13) holds, the first coordinates of the first operation are located between the first boundary point and the second boundary point.

In a case that the first multimedia data is displayed on the second display unit in a landscape mode, it is judged whether formula (14) holds.

$$Y1 \leq y_1 Y2 \quad (14)$$

In a case that formula (14) holds, the first coordinates of the first operation are located between the first boundary point and the second boundary point.

In step 306, in a case that the first judging result indicates that the first coordinates of the first operation is located between the first boundary point and the second boundary point, a second transform parameter is determined based on the first parameter, the second parameter, the coordinates of the first boundary point and the coordinates of the second boundary point.

In a case that the first multimedia data is displayed on the second display unit in a portrait mode, the second transform parameter is $-X1 \times P/M$, Q/N.

In a case that the first multimedia data is displayed on the second display unit in a landscape mode, the second transform parameter is P/M, $-Y1 \times Q/N$.

In step 307, the first coordinates of the first operation are transformed by the second transform parameter, to obtain second coordinates of the first operation.

Provided that the second coordinates of the first operation are $(x_2, y_2)$, the process of transforming the first coordinates of the first operation by the second transform parameter may be as follows.

In a case that the first multimedia data is displayed on the second display unit in a portrait mode, the second coordinates of the first operation are obtained by formula (15).

$$x_2 = (x_1 - X1) \times P/M$$

$$y_2 = y_1 \times Q/N \quad (15)$$

In a case that the first multimedia data is displayed on the second display unit in a landscape mode, the second coordinates of the first operation are obtained by formula (16).

$$x_2 = x_1 \times P/M$$

$$y_2 = (y_1 - Y1) \times Q/N \quad (16)$$

In step 308, the first operation is performed based on the second coordinates of the first operation.

Since the second coordinates of the first operation are coordinates in the first display unit, the electronic device can process and respond to the first operation.

Figure 4:
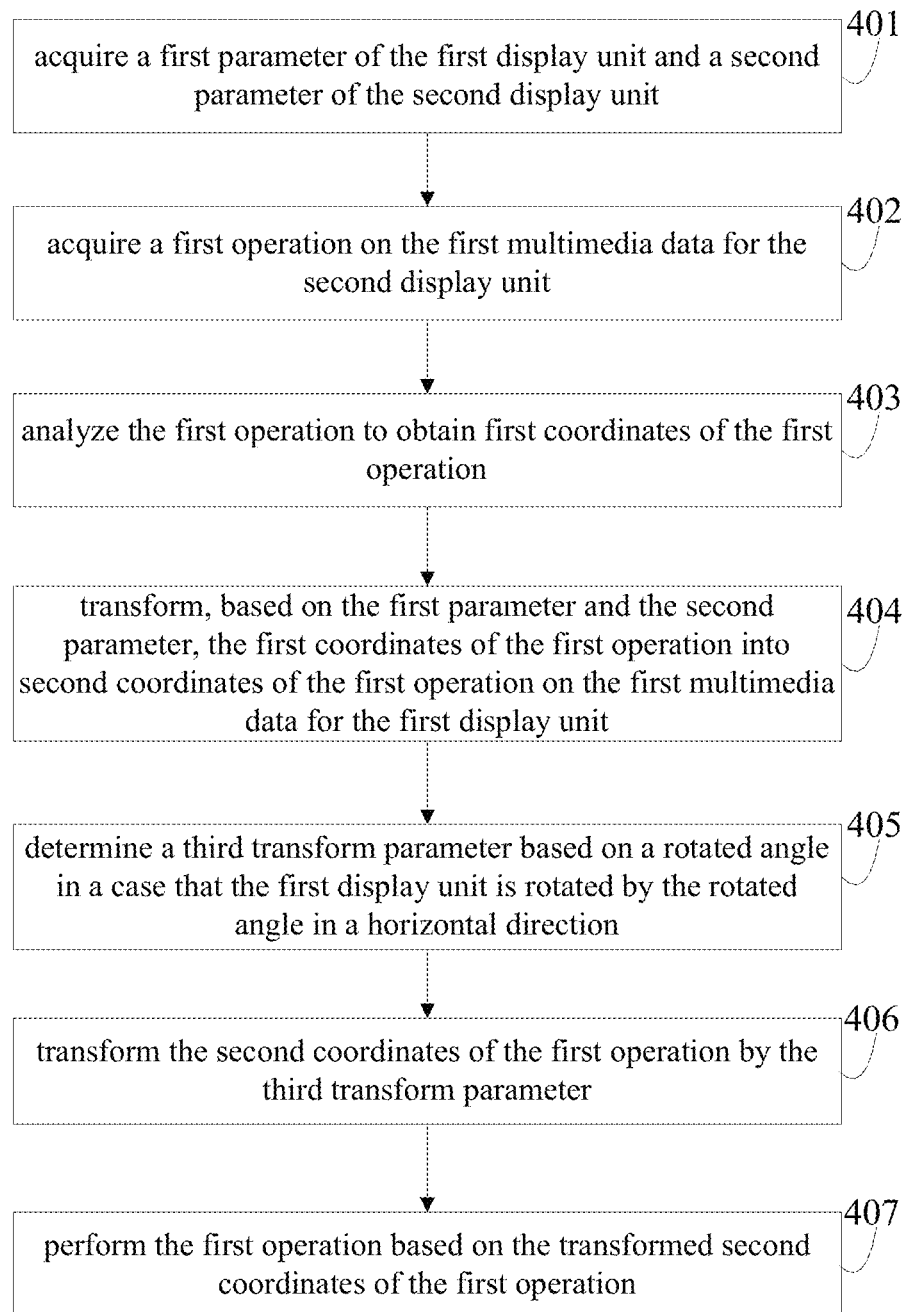
FIG. 4 is a schematic flowchart of an information processing method according to an embodiment of the disclosure.

FIG. 4 is a schematic flowchart of an information processing method according to an embodiment of the disclosure. The information processing method in the embodiment is applied to an electronic device, the electronic device is capable of making first multimedia data displayed synchronously on a first display unit and a second display unit, and the first display unit is located in the electronic device. In a preferred embodiment of the disclosure, the information processing method includes steps 401 to 407.

In step 401, a first parameter of the first display unit and a second parameter of the second display unit are acquired.

In the embodiment, the first display unit is a display apparatus in the electronic device, such as a touch display screen, and the first display unit is a host screen. The first parameter of the first display unit is screen resolution of the first display unit. The second display unit is an extended screen. The second display unit may be a projection unit using a microcast technology or may be a display apparatus using a wifi display technology. The second parameter of the second display unit is screen resolution of the second display unit.

Since the first display unit is located in the electronic device, the first parameter of the first display unit may be acquired directly. In a case that the second display unit is a projection unit using the microcast technology, the second display unit is also located in the electronic device, and thus the second parameter of the second display unit may also be acquired directly. In a case that the second display unit is a display apparatus using the wifi display technology, the second display unit is independent of the electronic device, and the second display unit interacts with the electronic device via a wifi network, therefore, the electronic device may acquire the second parameter of the second display unit via the wifi network.

The first multimedia data in the embodiment is multimedia data displayed on a desktop of the electronic device. For example, the first multimedia data is video data in a case that a video is played on the desktop in a full screen mode.

In step 402, a first operation on the first multimedia data for the second display unit is acquired.

A user may operate on the first multimedia data for the second display unit, which refers to as the first operation. For example, in a case that the second display unit is a touch display screen, the user may touch the second display unit to interact with the first multimedia data.

In order to enable the electronic device in the embodiment to process and respond to the first operation, the electronic device needs to acquire the first operation on the first multimedia data for the second display unit. In a case that the second display unit is a projection unit using the microcast technology, the electronic device may acquire the first operation by deep detection. In a case that the second display unit is a display apparatus using the wifi display technology, the second display unit is independent of the electronic device, and the second display unit interacts with the electronic device via a wifi network, therefore, the electronic device may acquire the first operation via the wifi network.

The first operation may be, for example, a touch operation, a key operation, a gesture operation or a voice operation.

In step 403: the first operation is analyzed, to obtain first coordinates of the first operation.

The first operation herein corresponds to coordinate information, and the coordinate information is position information of the first operation in the second display unit. Therefore, the first coordinates are coordinates of the first operation in the second display unit.

In step 404, the first coordinates of the first operation are transformed based on the first parameter and the second parameter, to obtain second coordinates of the first operation on the first multimedia data for the first display unit.

The first coordinates of the first operation herein are two-dimensional coordinates, for example, x1 coordinate and y1 coordinate. The x1 coordinate and the y1 coordinate are transformed respectively based on the first parameter and the second parameter, to obtain x2 coordinate and y2 coordinate. The x2 coordinate and y2 coordinate are the second coordinates of the first operation. The second coordinates are coordinates of the first operation in the first display unit.

In step 405, in a case that the first display unit is rotated by an angle in a horizontal direction, a third transform parameter is determined based on the rotated angle.

In an implementation, the first display unit may be rotated by 90 degree, 180 degree or 270 degree in the horizontal direction. In a case that the first display unit is not rotated, the third transform parameter is $$\begin{pmatrix} 1 & 0 \\ 0 & 1 \end{pmatrix}.$$

In a case that the first display unit is rotated by 90 degree, the third transform parameter is $$\begin{pmatrix} 0 & 1 \\ 1 & 0 \end{pmatrix}.$$

In a case that the first display unit is rotated by 180 degree, the third transform parameter is $$\begin{pmatrix} P \\ Q \end{pmatrix}.$$

In a case that the first display unit is rotated by 270 degree, the third transform parameter is $$\begin{pmatrix} Q \\ P \end{pmatrix}.$$

In step 406, the second coordinates of the first operation are transformed by the third transform parameter.

Provided that the transformed second coordinates are $(x_{20}, y_{20})$. In a case that the first display unit is not rotated, the process of transforming the second coordinates of the first operation by the third transform parameter may be realized by the following formula (17).

$$\begin{pmatrix} x_{20} \\ y_{20} \end{pmatrix} = \begin{pmatrix} 1 & 0 \\ 0 & 1 \end{pmatrix} \times \begin{pmatrix} x_2 \\ y_2 \end{pmatrix} \quad (17)$$

In a case that the first display unit is rotated by 90 degree, the process of transforming the second coordinates of the first operation by the third transform parameter may be realized by the following formula (18).

$$\begin{pmatrix} x_{20} \\ y_{20} \end{pmatrix} = \begin{pmatrix} 0 & 1 \\ 1 & 0 \end{pmatrix} \times \begin{pmatrix} x_2 \\ y_2 \end{pmatrix} \quad (18)$$

In a case that the first display unit is rotated by 180 degree, the process of transforming the second coordinates of the first operation by the third transform parameter may be realized by the following formula (19).

$$\begin{pmatrix} x_{20} \\ y_{20} \end{pmatrix} = \begin{pmatrix} P \\ Q \end{pmatrix} - \begin{pmatrix} x_2 \\ y_2 \end{pmatrix} \quad (19)$$

In a case that the first display unit is rotated by 270 degree, the process of transforming the second coordinates of the first operation by the third transform parameter may be realized by the following formula (20).

$$\begin{pmatrix} x_{20} \\ y_{20} \end{pmatrix} = \begin{pmatrix} Q \\ P \end{pmatrix} - \begin{pmatrix} y_2 \\ x_2 \end{pmatrix} \quad (20)$$

In step 407, the first operation is performed based on the transformed second coordinates.

Since the transformed second coordinates of the first operation are coordinates in the first display unit, the electronic device can process and respond to the first operation.

Figure 5:
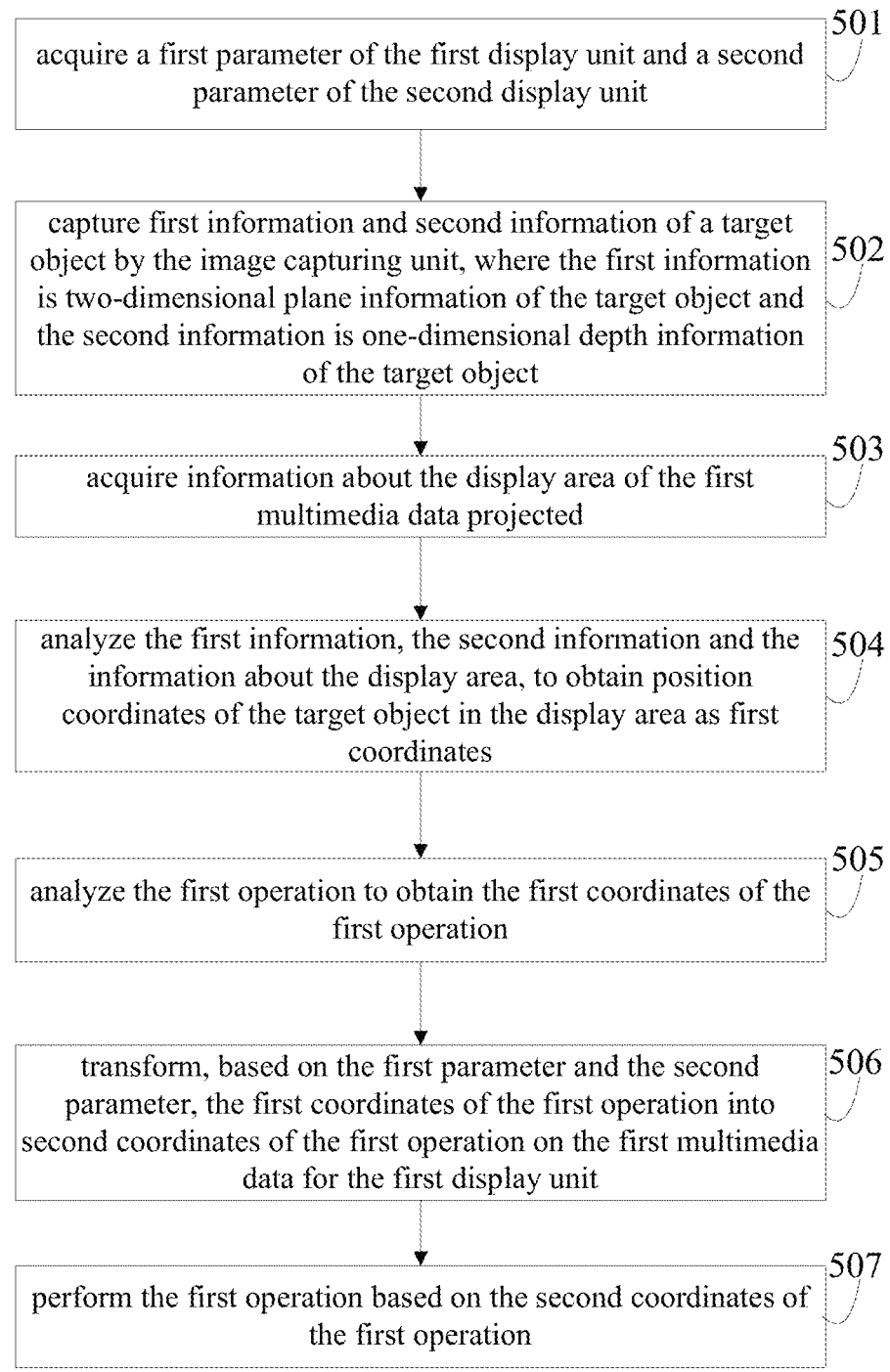
FIG. 5 is a schematic flowchart of an information processing method according to an embodiment of the disclosure.

FIG. 5 is a schematic flowchart of an information processing method according to an embodiment of the disclosure. The information processing method in the embodiment is applied to an electronic device, the electronic device is capable of making first multimedia data displayed synchronously on a first display unit and a second display unit, and the first display unit and the second display unit are located in the electronic device. The electronic device projects the first multimedia data through the second display unit, and the electronic device further includes an image capturing unit. In a preferred embodiment of the disclosure, the information processing method includes steps 501 to 507.

In step 501, a first parameter of the first display unit and a second parameter of the second display unit are acquired.

In the embodiment, the first display unit is a display apparatus in the electronic device, such as a touch display screen, and the first display unit is a host screen. The first parameter of the first display unit is screen resolution of the first display unit. The second display unit is an extended screen. The second display unit may be a projection unit using a microcast technology or may be a display apparatus using a wifi display technology. The second parameter of the second display unit is screen resolution of the second display unit.

Since the first display unit is located in the electronic device, the first parameter of the first display unit may be acquired directly. In a case that the second display unit is a projection unit using the microcast technology, the second display unit is also located in the electronic device, and thus the second parameter of the second display unit may also be acquired directly. In a case that the second display unit is a display apparatus using the wifi display technology, the second display unit is independent of the electronic device, and the second display unit interacts with the electronic device via a wifi network, therefore, the electronic device may acquire the second parameter of the second display unit via the wifi network.

The first multimedia data in the embodiment is multimedia data displayed on a desktop of the electronic device. For example, the first multimedia data is video data in a case that a video is played on the desktop in a full screen mode.

In step 502, first information and second information of a target object is captured by the image capturing unit, where the first information is two-dimensional plane information of the target object, and the second information is one-dimensional depth information of the target object.

The image capturing unit herein may be a depth sensor. The user may perform touch operation on a display area projected by the second display unit, and the image capturing unit captures three-dimensional information of the user's hand, where the three-dimensional information includes two-dimensional plane information and one-dimensional depth information.

In step 503, information about a display area of the first multimedia data projected is acquired.

The information about the display area of the first multimedia data projected may be calculated based on a focal length parameter of the second display unit, a distance between the second display unit and a projection screen, and other parameters.

In step 504, the first information, the second information and the information about the display area are analyzed, to obtain position coordinates of the target object in the display area, as first coordinates.

After the three-dimensional coordinate information of the target object is determined, coordinates of the three-dimensional coordinates in the display area are also required to be determined.

In step 505, the first operation is analyzed, to obtain first coordinates of the first operation.

The first operation herein corresponds to coordinate information, and the coordinate information is position information of the first operation in the second display unit. Therefore, the first coordinates are coordinates of the first operation in the second display unit.

In step 506, the first coordinates of the first operation are transformed based on the first parameter and the second parameter, to obtain second coordinates of the first operation on the first multimedia data for the first display unit.

The first coordinates of the first operation herein are two-dimensional coordinates, for example, x1 coordinate and y1 coordinate. The x1 coordinate and the y1 coordinate are transformed respectively based on the first parameter and the second parameter, to obtain x2 coordinate and y2 coordinate. The x2 coordinate and y2 coordinate are the second coordinates of the first operation. The second coordinates are coordinates of the first operation in the first display unit.

In step 507, the first operation is performed based on the second coordinates of the first operation.

Since the second coordinates of the first operation are coordinates in the first display unit, the electronic device can process and respond to the first operation.

Figure 6:
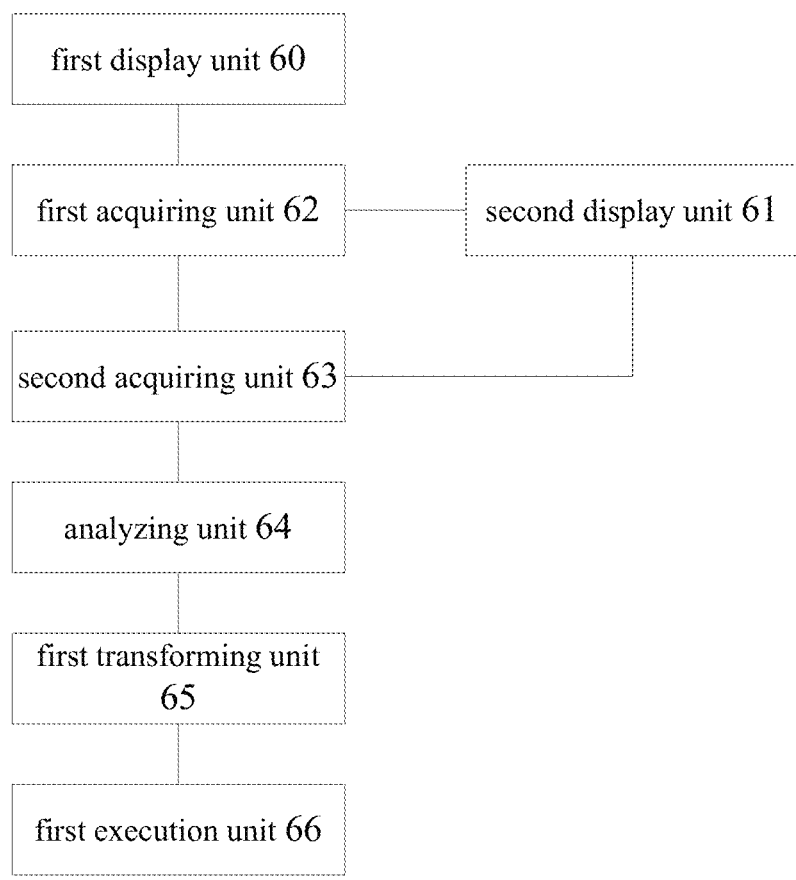
FIG. 6 is a schematic structural diagram of an electronic device according to an embodiment of the disclosure.

FIG. 6 is a schematic structural diagram of an electronic device according to an embodiment of the disclosure. The electronic device in the embodiment is capable of making first multimedia data displayed synchronously on a first display unit 60 and a second display unit 61, and the first display unit 60 is located in the electronic device. The electronic device includes a first acquiring unit 62, a second acquiring unit 63, an analyzing unit 64, a first transforming unit 65 and a first execution unit 66.

The first acquiring unit 62 is configured to acquire a first parameter of the first display unit 60 and a second parameter of the second display unit 61.

The second acquiring unit 63 is configured to acquire a first operation on the first multimedia data for the second display unit 61.

The analyzing unit 64 is configured to analyze the first operation to obtain first coordinates of the first operation.

The first transforming unit 65 is configured to transform, based on the first parameter and the second parameter, the first coordinates of the first operation into second coordinates of the first operation on the first multimedia data for the first display unit 60.

The first execution unit 66 is configured to perform the first operation based on the second coordinates of the first operation.

It should be understood by those skilled in the art that functions realized by each unit in the electronic device shown in FIG. 6 may be understood with reference to the description of the information processing method described above.

Figure 7:
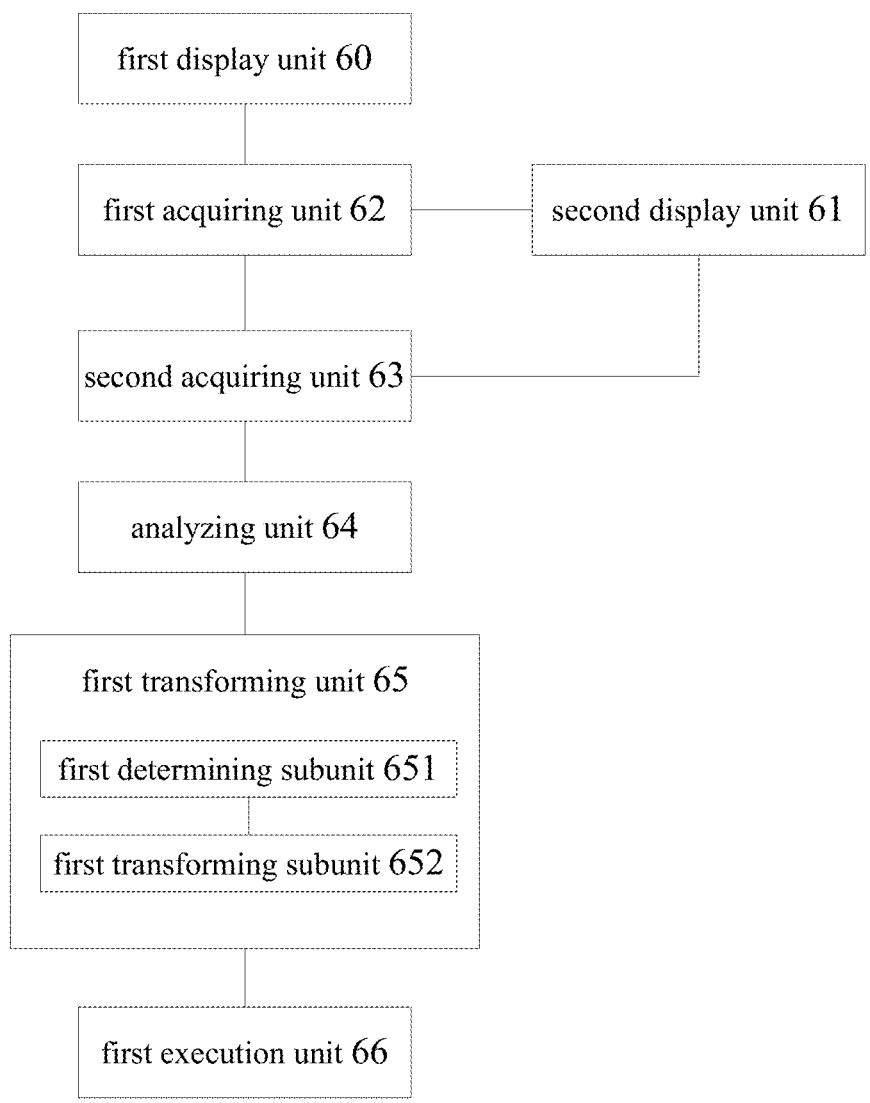
FIG. 7 is a schematic structural diagram of an electronic device according to an embodiment of the disclosure.

FIG. 7 is a schematic structural diagram of an electronic device according to an embodiment of the disclosure. The electronic device in the embodiment is capable of making first multimedia data displayed synchronously on a first display unit 60 and a second display unit 61, and the first display unit 60 is located in the electronic device. The electronic device includes a first acquiring unit 62, a second acquiring unit 63, an analyzing unit 64, a first transforming unit 65 and a first execution unit 66.

The first acquiring unit 62 is configured to acquire a first parameter of the first display unit 60 and a second parameter of the second display unit 61.

The second acquiring unit 63 is configured to acquire a first operation on the first multimedia data for the second display unit 61.

The analyzing unit 64 is configured to analyze the first operation to obtain first coordinates of the first operation.

The first transforming unit 65 is configured to transform, based on the first parameter and the second parameter, the first coordinates of the first operation into second coordinates of the first operation on the first multimedia data for the first display unit 60.

The first execution unit 66 is configured to perform the first operation based on the second coordinates of the first operation.

In an implementation, the first transforming unit 65 includes a first determining subunit 651 and a first transforming subunit 652.

The first determining subunit 651 is configured to determine a first transform parameter based on the first parameter and the second parameter.

The first transforming subunit 652 is configured to transform the first coordinates of the first operation into second coordinates of the first operation by the first transform parameter.

It should be understood by those skilled in the art that functions realized by each unit in the electronic device shown in FIG. 7 may be understood with reference to the description of the information processing method described above.

Figure 8:
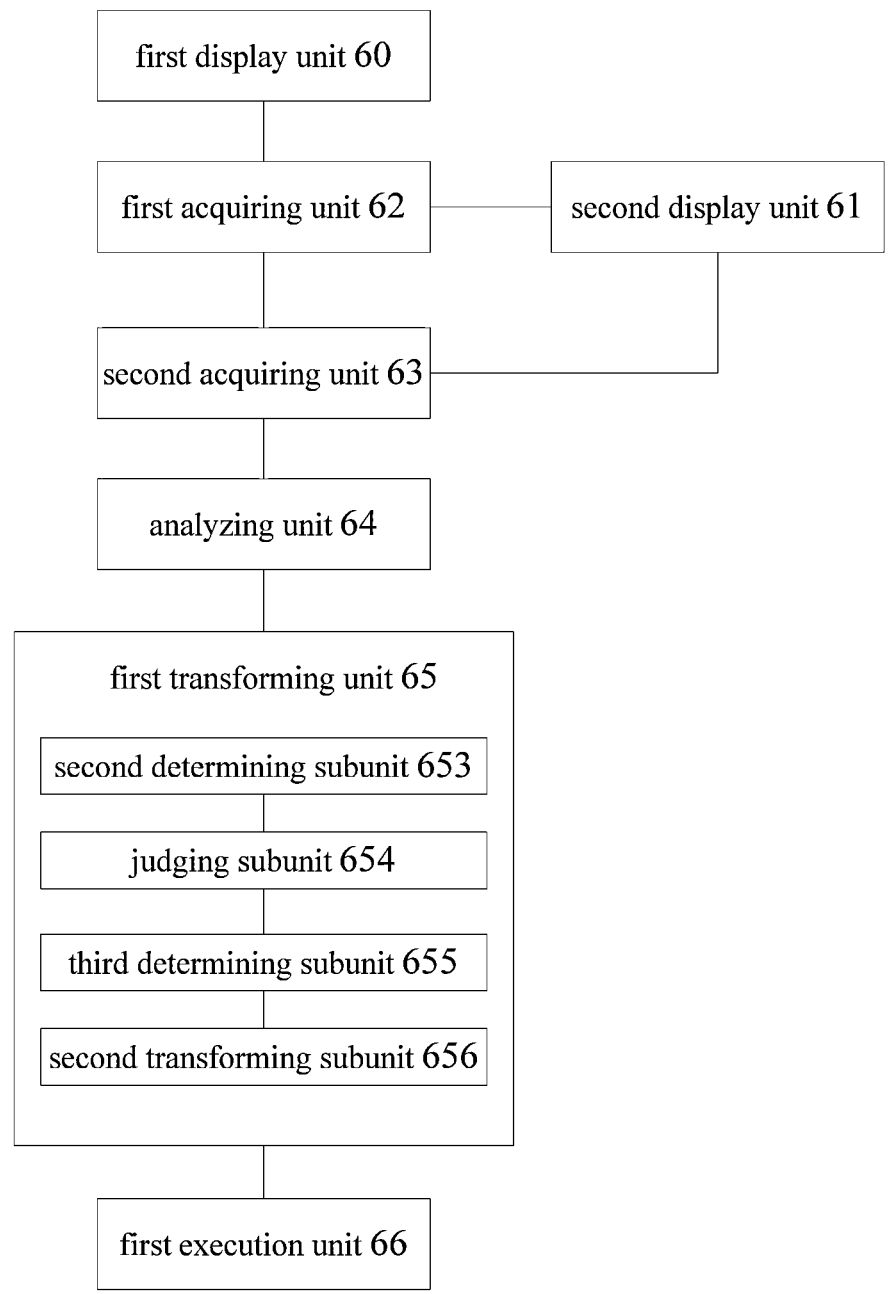
FIG. 8 is a schematic structural diagram of an electronic device according to an embodiment of the disclosure.

FIG. 8 is a schematic structural diagram of an electronic device according to an embodiment of the disclosure. The electronic device in the embodiment is capable of making first multimedia data displayed synchronously on a first display unit 60 and a second display unit 61, and the first display unit 60 is located in the electronic device. The electronic device includes a first acquiring unit 62, a second acquiring unit 63, an analyzing unit 64, a first transforming unit 65 and a first execution unit 66.

The first acquiring unit 62 is configured to acquire a first parameter of the first display unit 60 and a second parameter of the second display unit 61.

The second acquiring unit 63 is configured to acquire a first operation on the first multimedia data for the second display unit 61.

The analyzing unit 64 is configured to analyze the first operation to obtain first coordinates of the first operation.

The first transforming unit 65 is configured to transform, based on the first parameter and the second parameter, the first coordinates of the first operation into second coordinates of the first operation on the first multimedia data for the first display unit 60.

The first execution unit 66 is configured to perform the first operation based on the second coordinates of the first operation.

In an implementation, the first transforming unit 65 includes a second determining subunit 653, a judging subunit 654, a third determining subunit 655 and a second transforming subunit 656.

The second determining subunit 653 is configured to determine a display area of the second display unit 61 on which the first multimedia data is displayed based on the first parameter and the second parameter, where the display area is demarcated by a first boundary point and a second boundary point.

The judging subunit 654 is configured to judge whether the first coordinates of the first operation is located between the first boundary point and the second boundary point based on the first coordinates of the first operation, to obtain a first judging result.

The third determining subunit 655 is configured to determine a second transform parameter based on the first parameter, the second parameter, coordinates of the first boundary point and coordinates of the second boundary point, in a case that the first judging result indicates that the first coordinates of the first operation is located between the first boundary point and the second boundary point.

The second transforming subunit 656 is configured to transform the first coordinates of the first operation into second coordinates of the first operation by the second transform parameter.

It should be understood by those skilled in the art that functions realized by each unit in the electronic device shown in FIG. 8 may be understood with reference to the description of the information processing method described above.

Figure 9:
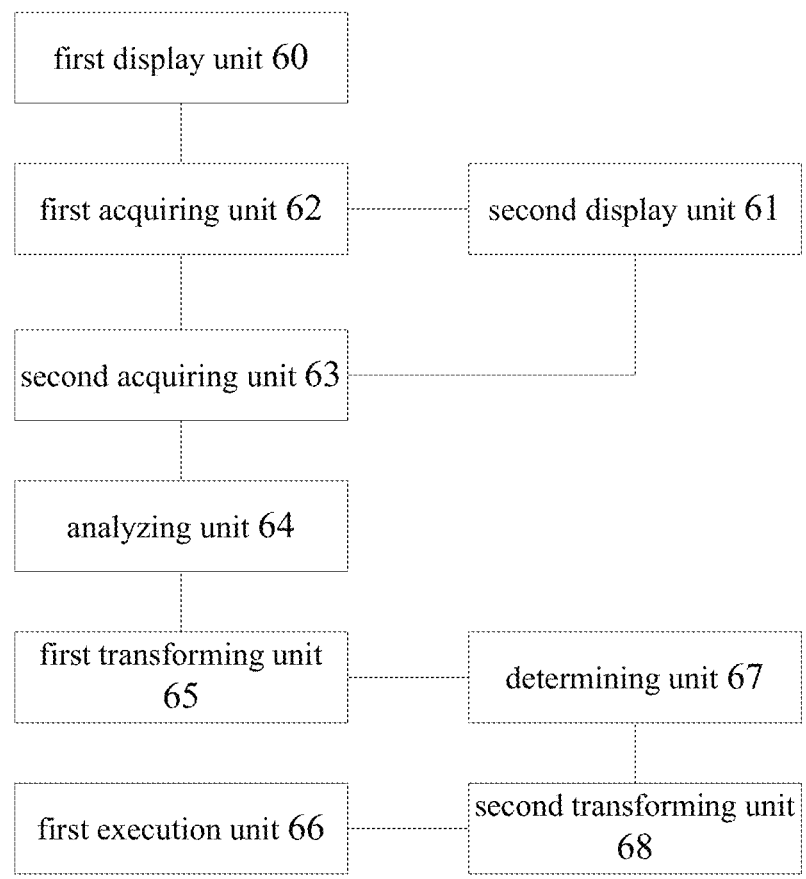
FIG. 9 is a schematic structural diagram of an electronic device according to an embodiment of the disclosure.

FIG. 9 is a schematic structural diagram of an electronic device according to an embodiment of the disclosure. The electronic device is capable of making first multimedia data displayed synchronously on a first display unit 60 and a second display unit 61, and the first display unit 60 is located in the electronic device. The electronic device includes a first acquiring unit 62, a second acquiring unit 63, an analyzing unit 64, a first transforming unit 65 and a first execution unit 66.

The first acquiring unit 62 is configured to acquire a first parameter of the first display unit 60 and a second parameter of the second display unit 61.

The second acquiring unit 63 is configured to acquire a first operation on the first multimedia data for the second display unit 61.

The analyzing unit 64 is configured to analyze the first operation to obtain first coordinates of the first operation.

The first transforming unit 65 is configured to transform, based on the first parameter and the second parameter, the first coordinates of the first operation into second coordinates of the first operation on the first multimedia data for the first display unit 60.

The first execution unit 66 is configured to perform the first operation based on the second coordinates of the first operation.

In an implementation, the electronic device further includes a determining unit 67 and a second transforming unit 68;

the determining unit 67 is configured to determine a third transform parameter based on a rotated angle;

the second transforming unit 68 is configured to transform the second coordinates of the first operation by the third transform parameter; and the first execution unit 66 is configured to perform the first operation based on transformed second coordinates.

It should be understood by those skilled in the art that functions realized by each unit in the electronic device shown in FIG. 9 may be understood with reference to the description of the information processing method described above.

Figure 10:
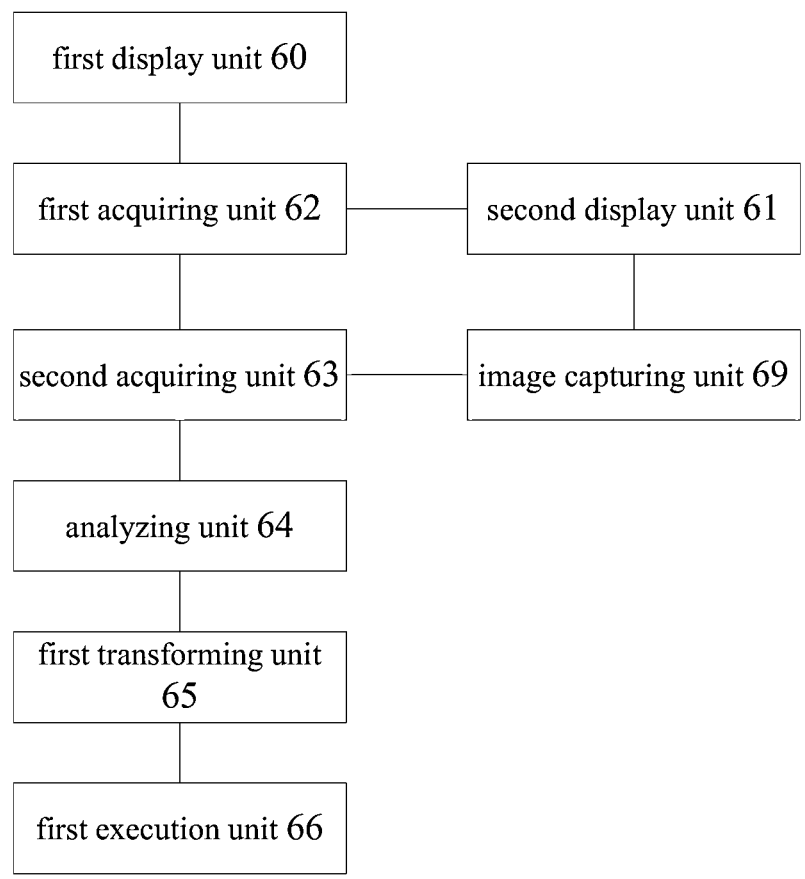
FIG. 10 is a schematic structural diagram of an electronic device according to an embodiment of the disclosure.

FIG. 10 is a schematic structural diagram of an electronic device according to an embodiment of the disclosure. The electronic device in the embodiment is capable of making first multimedia data displayed synchronously on a first display unit 60 and a second display unit 61, and the first display unit 60 is located in the electronic device. The electronic device includes a first acquiring unit 62, a second acquiring unit 63, an analyzing unit 64, a first transforming unit 65 and a first execution unit 66.

The first acquiring unit 62 is configured to acquire a first parameter of the first display unit 60 and a second parameter of the second display unit 61.

The second acquiring unit 63 is configured to acquire a first operation on the first multimedia data for the second display unit 61.

The analyzing unit 64 is configured to analyze the first operation to obtain first coordinates of the first operation.

The first transforming unit 65 is configured to transform, based on the first parameter and the second parameter, the first coordinates of the first operation into second coordinates of the first operation on the first multimedia data for the first display unit 60.

The first execution unit 66 is configured to perform the first operation based on the second coordinates of the first operation.

In an implementation, the electronic device further includes an image capturing unit 69, the image capturing unit 69 is configured to capture first information and second information of a target object, where the first information is two-dimensional plane information of the target object, and the second information is one-dimensional depth information of the target object;

the second acquiring unit 63 is further configured to acquire information about a display area of the first multimedia data projected; and the analyzing unit 64 is further configured to analyze the first information, the second information and the information about the display area, to obtain position coordinates of the target object in the display area.

It should be understood by those skilled in the art that functions realized by each unit in the electronic device shown in FIG. 10 may be understood with reference to the description of the information processing method described above.

An image calibration method is further provided according to an embodiment of the disclosure. The image calibration method is applied to an electronic device, the electronic device includes a micro projector and a depth camera, and a relative position between the micro projector and the depth camera is fixed. The image calibration method includes:

acquiring a depth image formed by the depth camera on a projection plane, where the projection plane is a plane that the depth camera irradiates and the micro projector projects a light beam on; and obtaining a relative position of a projection region in the depth image based on the relative position between the micro projector and the depth camera, where the projection region is a region formed by the micro projector on the projection plane.

It can be seen from the above solution of the image calibration method that the relative position of the projection region in the depth image can be calibrated automatically. Even in a case that the micro projector or the projection plane is changed, the relative position of the projection region in the depth image can be obtained based on the relative position between the micro projector and the depth camera, without the user's operation to re-calibrate the relative position, thus speeding up the calibration and increasing efficiency.

The technical solutions of the image calibration method will be described clearly and completely hereinafter in conjunction with the drawings in the embodiments of the invention. Apparently, the embodiments described are only a few but not all of the embodiments of the invention. All the other embodiments acquired by those skilled in the art without creative effort on the basis of the embodiments of the invention fall within the scope of protection of the present invention.

Figure 13:
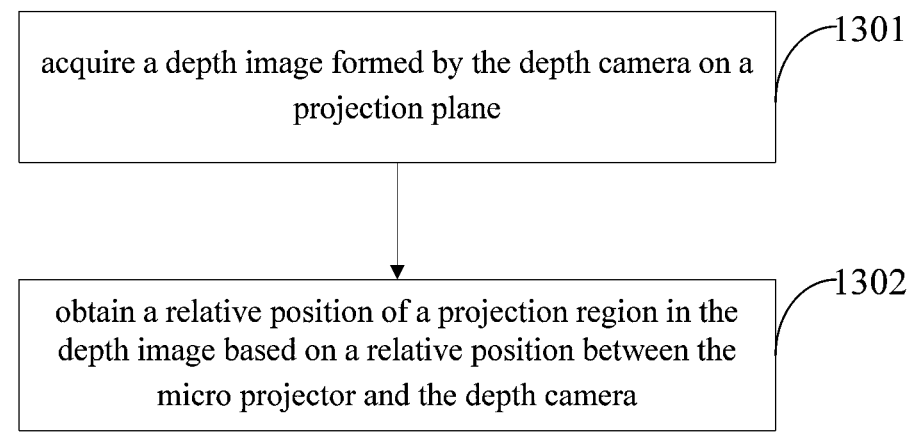
FIG. 13 is a flowchart of an image calibration method according to an embodiment of the disclosure.

Reference is made to FIG. 13 which is a flowchart of an image calibration method according to an embodiment of the disclosure. The image calibration method is applied to an electronic device, the electronic device includes a micro projector and a depth camera, and a relative position between the micro projector and the depth camera is fixed.

Referring to FIG. 13, the image calibration method includes steps 1301 to 1302.

In step 1301, a depth image formed by the depth camera on a projection plane is acquired, where the projection plane is a plane that the depth camera irradiates and the micro projector projects a light beam on.

The depth image is an image having three-dimensional feature information, i.e., depth information, of an object. The depth information refers to a distance between the depth camera and a certain point in a scene corresponding to the depth image.

In the embodiment, coordinates of each pixel point in the depth image are represented by pixel coordinates. For example, if the depth image is a rectangle depth image of 640*480, pixel coordinates of a central point of the depth image is (320,240), where 640 is a lateral resolution of the depth image and 480 is a vertical resolution of the depth image.

In step 1302, a relative position of a projection region in the depth image is obtained based on the relative position between the micro projector and the depth camera, where the projection region is a region formed by the micro projector on the projection plane.

It can be understood that the relative position of the projection region in the depth image may be represented by pixel coordinates of four apexes of the projection region in the depth image.

Figure 14:
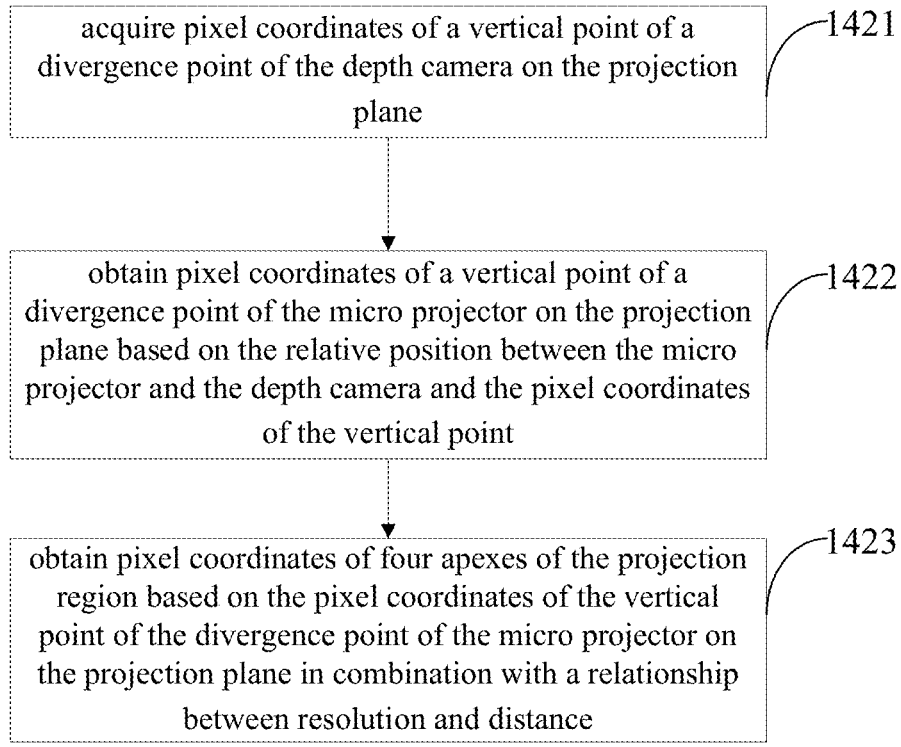
FIG. 14 is a sub-flowchart of an image calibration method according to an embodiment of the disclosure.

In the embodiment, the process of obtaining the relative position of the projection region in the depth image may include steps 1421 to 1423, as shown in FIG. 14.

In step 1421, pixel coordinates of a vertical point of a divergence point of the depth camera on the projection plane are acquired, where the divergence point of the depth camera is an apex of a cone formed in space by a light beam emitted from the depth camera.

Figure 15:
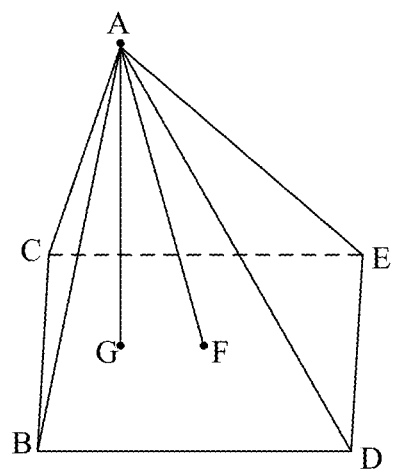
FIG. 15 is a diagram of a light beam emitted from a depth camera.

Parameters of the depth camera such as the divergence point, the central point and the vertical point are explained below with reference to a diagram of a light beam emitted from a depth camera shown in FIG. 15. In FIG. 15, points B, C, D and E are points formed by a light beam emitted from a point A to a projection plane. The graphics form by the five points A, B, C, D and E is a cone formed in space by a light beam emitted from the depth camera, therefore, point A is the divergence point of the depth camera. An intersecting point between the projection plane and a vertical line from point A to the projection plane is the vertical point of the divergence point on the projection plane.

The region formed by points B, C, D and E is the region irradiated by the depth camera on the projection plane, and the depth image acquired by the depth camera is a depth image of the region. The region irradiated by the depth camera is a rectangular region, and central point F of the rectangle is the central point of the depth image.

Coordinates of each pixel point in the depth image are represented by pixel coordinates. In a case that the depth image is a rectangular depth image, pixel coordinates of the central point of the depth image may be acquired. For example, if the depth image is a rectangle depth of 640*480, pixel coordinates of the central point of the depth image is (320, 240).

The depth image is an image having depth information. The depth information refers to a distance between the depth camera and a certain point in a scene corresponding to the depth image. Specifically, the depth information is a distance from each point in the projection plane to the divergence point, therefore, the length of line AG and the length of line AF can be known. The length of line GF may be calculated by Pythagorean theorem since line AG is vertical to the projection plane, that is, the distance between the central point of the depth image and the vertical point of the divergence point of the depth camera on the projection plane is obtained.

In a case that line GF is parallel to line CE, vertical point G and central point F have the same vertical pixel coordinate, and horizontal pixel coordinates of vertical point G may be obtained based on a relationship between resolution and distance, thus the pixel coordinates of vertical point G are obtained.

Figure 16:
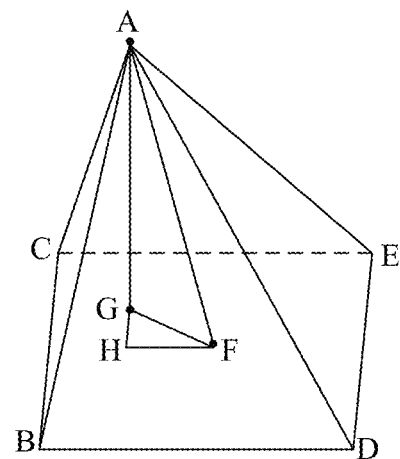
FIG. 16 is a schematic diagram of distance calculation according to an embodiment of the disclosure.

In a case that line GF is not parallel to line CE, vertical point G and central point F have different horizontal pixel coordinates and different vertical pixel coordinates. In this case, it is necessary to further calculate a relative position between vertical point G and central point F, that is, a distance from the horizontal pixel coordinate of vertical point G to the horizontal pixel coordinate of central point F and a distance from the vertical pixel coordinate of vertical point G to the vertical pixel coordinate of central point F, and details is described with reference to FIG. 16.

A line parallel to line CE is made from central point F, a line parallel to line CB is made from vertical point G, and an intersecting point between the two made lines is marked as H. It can be known by the skilled in the art that, the length of line GH is the distance from the vertical pixel coordinate of vertical point G to the vertical pixel coordinate of central point F, the length of line HF is the distance from the horizontal pixel coordinate of vertical point G to the horizontal pixel coordinate of central point F, and line GH is vertical to line HF.

The length of line GH and the length of line HF may be acquired as follows. The length of line AG and the length of line AF may be acquired firstly from the depth image, and the length of line GF in right triangle AGF is obtained by Pythagorean theorem. The length of line AH is then acquired from the depth image, and the length of line GH in right triangle AGH is obtained by Pythagorean theorem. The length of line HF in right triangle GHF is further obtained by Pythagorean theorem.

After the length of line HF and the length of line GH, that is, after obtaining the distance from the horizontal pixel coordinate of vertical point G to the horizontal pixel coordinate of central point F and the distance from the vertical pixel coordinate of vertical point G to the vertical pixel coordinate of central point F, pixel coordinates of the vertical point is obtained in connection with a relationship between resolution and distance.

A process of acquiring the relationship between resolution and distance may be as follows. The length of line AC and the length of line AE may be obtained from the depth image, the value of vertex angle CAE of triangle ACE is a visual angle of the depth camera, and the length of line CE may be obtained by a triangle theorem. The length of line CB may be obtained similarly. Further, lateral resolution and vertical resolution of the depth image are known, and the relationship between resolution and distance may be obtained.

For example, in a case that the depth image is a depth image of 640*480, lateral resolution of the depth image is 640, vertical resolution of the depth image is 480, the length of line CE is 20 cm and the length of line CB is 15 cm, the relationship between resolution and distance is that each centimeter in horizontal distance indicates 32 lateral resolution and each centimeter in vertical distance indicates 32 vertical resolution.

In the embodiment, the process of acquiring the distance between the central point and the vertical point of the divergence point of the depth camera on the projection plane may also be as follows.

An angular value of an angle between a normal of the projection plane and a line joining the central point of the depth image and the divergence point of the depth camera is obtained, and then the distance between the central point and the vertical point is obtained based on depth information of the central point of the depth image and the angular value in combination with Cosine theorem. The normal of the projection plane is obtained by a plane equation fitting. A process of obtaining the normal of the projection plane by the plane equation fitting may refer to the existing plane equation fitting process, which is not described in the embodiment.

Figure 17:
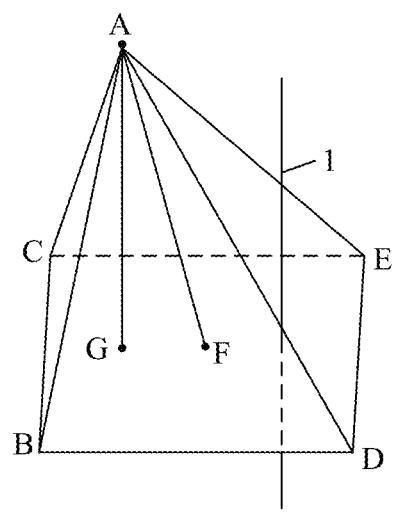
FIG. 17 is a schematic diagram of distance calculation according to an embodiment of the disclosure.

As shown in FIG. 17, the normal of the projection plane is parallel to line AG, therefore, the value of angle GAF is equal to the angular value of the angle between the normal 1 of the projection plane and the line joining the central point of the depth image and the divergence point of the depth camera, and thus after the value of angle GAF is obtained, the distance between the central point and the vertical point is obtained by the theorem based on the value of angle GAF in combination with the depth information of the central point of the depth image.

In step 1422, pixel coordinates of the vertical point of the divergence point of the micro projector on the projection plane are obtained based on the relative position between the micro projector and the depth camera and the pixel coordinates of the vertical point, where the divergence point of the micro projector is an apex of a cone formed in space by a light beam emitted from the micro projector.

It can be understood that the relative position between the vertical point of the divergence point of the depth camera on the projection plane and the vertical point of the divergence point of the micro projector on the projection plane is a relative position between the micro projector and the depth camera. After the pixel coordinates of the vertical point of the divergence point of the depth camera on the projection plane are acquired, the pixel coordinates of the vertical point of the divergence point of the micro projector on the projection plane can be obtained based on the relative position.

For example, dx is a distance along the horizontal X axis between the depth camera and the micro projector, and dy is a distance along Y axis between the depth camera and the micro projector. If the pixel coordinates of the vertical point of the divergence point of the depth camera on the projection plane are (x, y), the pixel coordinates of the vertical point of the divergence point of the micro projector on the projection plane are (lateral resolution corresponding to x+dx, vertical resolution corresponding to y+dy).

In step 1423, pixel coordinates of four apexes of the projection region are obtained based on the pixel coordinates of the vertical point of the divergence point of the micro projector on the projection plane in combination with a relationship between resolution and distance, to calibrate the relative position of the projection region in the depth image.

Figure 18:
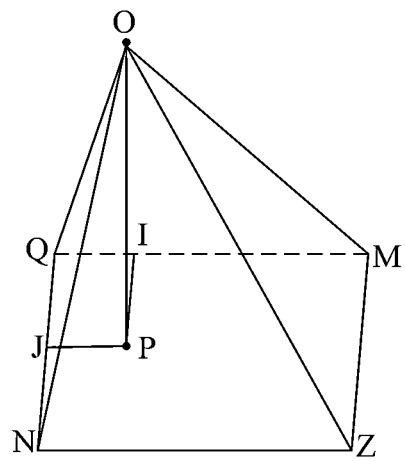
FIG. 18 is a schematic diagram of distance calculation according to an embodiment of the disclosure.

A process of acquiring the pixel coordinates of four apexes of the projection region is described below in detail in connection with FIG. 18. In FIG. 18, point O is the divergence point of the micro projector, point P is the vertical point of the divergence point of the micro projector on the projection plane, and points Q, M, N and Z are four apexes of the projection region. In the embodiment, the process of acquiring the pixel coordinates of the apex is explained by taking point Q as an example. Details are as follows.

Vertical lines are made from point P to line QM and line QN respectively, where intersecting points are I and J, and the length of line OI, the length of line OP and the length of line OJ may be acquired from the depth image, then the length of line PI and the length of line PJ may be obtained based on Pythagorean theorem.

After pixel coordinates of the vertical point of the divergence point of the micro projector on the projection plane are obtained, pixel coordinates of point Q are obtained in combination with the relationship between resolution and distance. Similarly, processes of acquiring pixel coordinates of points M, N and Z may refer to the process of acquiring the pixel coordinates of point Q.

In a case that the micro projector or the projection plane is changed, the relative position of the projection region in the depth image may also be obtained based on the relative position between the micro projector and the depth camera with reference to the contents shown in FIGS. 13 to 18. Compared with the conventional condition, the relative position of the projection region in the depth image can be obtained without user's operation to recalibrate the relative position according to the image calibration method of the embodiment, thus speeding up the calibration and increasing efficiency.

Figure 19:
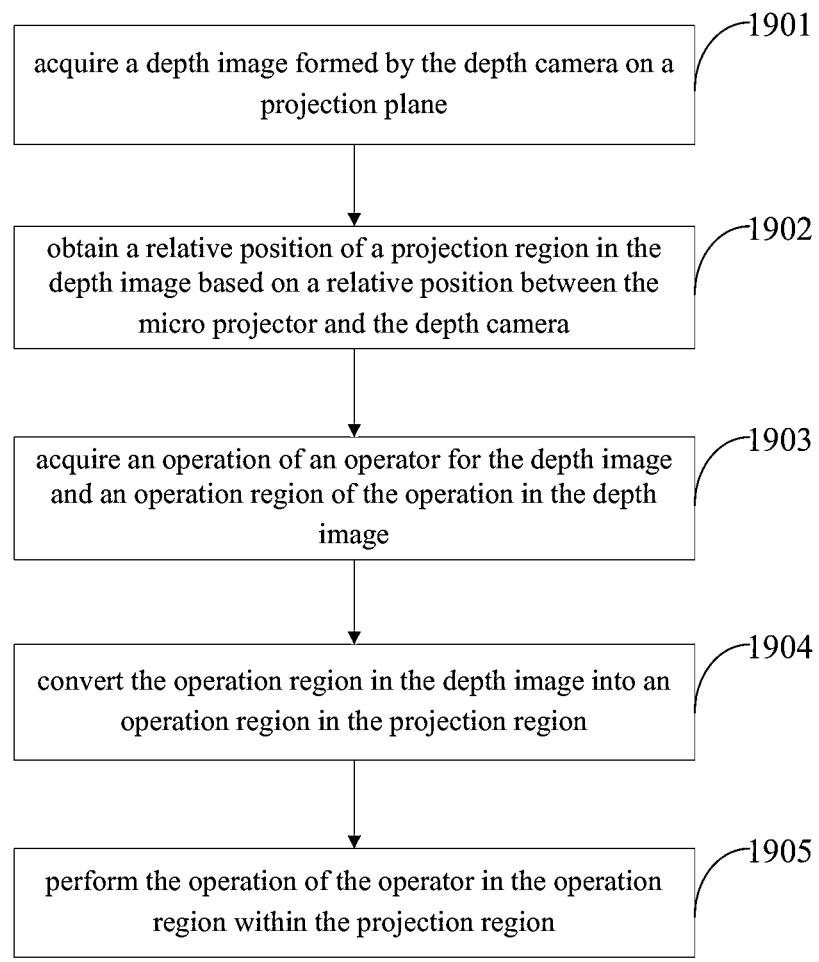
FIG. 19 is a flowchart of an image calibration method according to an embodiment of the disclosure.

After the relative position of the projection region in the depth image is calibrated, an operation in the depth image may be converted into an operation in the projection region. As shown in FIG. 19 which is a flowchart of an image calibration method according to an embodiment of the disclosure, the image calibration method includes steps 1901 to 1905.

In step 1901, a depth image formed by the depth camera on a projection plane is acquired, where the projection plane is a plane that the depth camera irradiates and the micro projector projects a light beam on.

In step 1902, a relative position of a projection region in the depth image is obtained based on the relative position between the micro projector and the depth camera, where the projection region is a region formed by the micro projector on the projection plane.

Details of steps 1901 and 1902 may refer to the description of steps 1301 and 1302, which are not described in detail in the embodiment.

In step 1903, an operation of an operator for the depth image and an operation region of the operation in the depth image are acquired.

The operation of the operator in the depth image includes a click operation and/or a swipe operation. In a case that the operator performs the click operation in the depth image, coordinates of the click of the click operation in the depth image are obtained. In a case that the operator performs the swipe operation in the depth image, coordinates of a point on an operated object such as a screen touched by the operator at the beginning of the swipe operation and coordinates of a point on the operated object touched by the operator at the end of the swipe operation are obtained.

In step 1904, the operation region in the depth image is converted into an operation region in the projection region.

The relative position of the projection region in the depth image is obtained; therefore, the operation region in the depth image is converted into the operation region in the projection region based on the relative position after the operation region in the depth image is obtained.

In step 1905, the operation of the operator is performed in the operation region within the projection region.

An image calibration apparatus corresponding to the above image calibration method is provided according to an embodiment of the disclosure. The image calibration apparatus is applied to an electronic device, the electronic device includes a micro projector and a depth camera, and a relative position between the micro projector and the depth camera is fixed.

Figure 20:
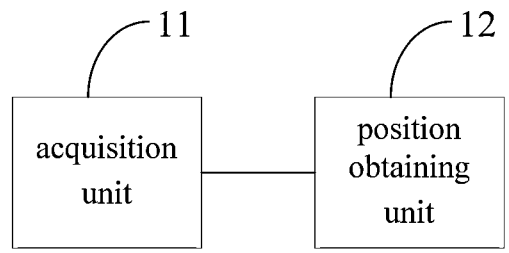
FIG. 20 is a schematic structural diagram of an image calibration apparatus according to an embodiment of the disclosure.
Figure 21:
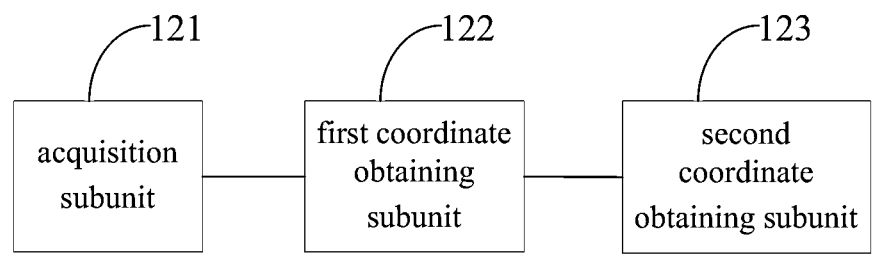
FIG. 21 is a sub-schematic structural diagram of an image calibration apparatus according to an embodiment of the disclosure.
Figure 22:
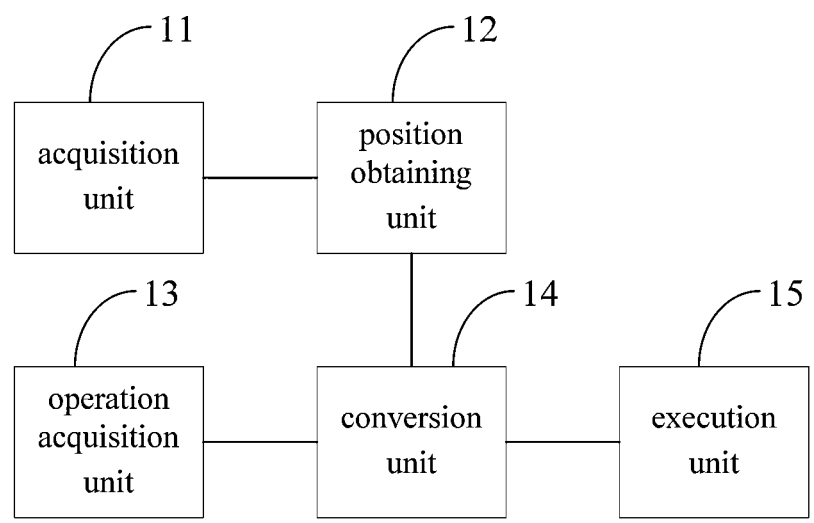
FIG. 22 is a schematic structural diagram of an image calibration apparatus according to an embodiment of the disclosure.

FIG. 20 illustrates a schematic structural diagram of an image calibration apparatus according to an embodiment of the disclosure, and the image calibration apparatus includes an acquisition unit 11 and a position obtaining unit 12.

The acquisition unit 11 is configured to acquire a depth image formed by the depth camera on a projection plane, where the projection plane is a plane that the depth camera irradiates and the micro projector projects a light beam on.

In the embodiment, the depth image is an image having three-dimensional feature information, i.e., depth information, of an object. The depth information refers to a distance between the depth camera and a certain point in a scene corresponding to the depth image.

Coordinates of each pixel point in the depth image are represented by pixel coordinates. For example, if the depth image is a rectangle depth image of 640*480, pixel coordinates of a central point of the depth image is (320,240), where 640 is a lateral resolution of the depth image and 480 is a vertical resolution of the depth image.

The position obtaining unit 12 is configured to obtain a relative position of a projection region in the depth image based on the relative position between the micro projector and the depth camera, where the projection region is a region formed by the micro projector on the projection plane.

It can be understood that the relative position of the projection region in the depth image may be represented by pixel coordinates of four apexes of the projection region in the depth image. FIG. 12 illustrates a schematic structural diagram of the position obtaining unit 12, including an acquisition subunit 121, a first coordinate obtaining subunit 122 and a second coordinate obtaining subunit 123.

The acquisition subunit 121 is configured to acquire pixel coordinates of a vertical point of a divergence point of the depth camera on the projection plane, where the divergence point of the depth camera is an apex of a cone formed in space by a light beam emitted from the depth camera.

The acquisition subunit may include a first coordinate acquisition subunit, a distance obtaining subunit and a second coordinate acquisition subunit.

The first coordinate acquisition subunit is configured to acquire pixel coordinates of a central point of the depth image.

The distance obtaining subunit is configured to obtain a distance between the central point and the vertical point of the divergence point of the depth camera on the projection plane.

In the embodiment, the distance obtaining subunit is configured to obtain the distance between the central point and the vertical point of the divergence point of the depth camera on the projection plane based on depth information of the central point and the depth information of the vertical point of the divergence point of the depth camera on the projection plane in combination with Pythagorean theorem; or obtain an angular value of an angle between a normal of the projection plane and a line joining the central point of the depth image and the divergence point of the depth camera and obtain the distance between the central point and the vertical point of the divergence point of the depth camera on the projection plane based on depth information of the central point of the depth image and the angular value in combination with Cosine theorem. The normal of the projection plane is obtained by a plane equation fitting.

The second coordinate acquisition subunit is configured to obtain the pixel coordinates of the vertical point of the divergence point of the depth camera on the projection plane based on the pixel coordinates of the central point of the depth image in combination with the relationship between resolution and distance.

The first coordinate obtaining subunit 122 is configured to obtain pixel coordinates of a vertical point of a divergence point of the micro projector on the projection plane based on the relative position between the micro projector and the depth camera and the pixel coordinates of the vertical point, where the divergence point of the micro projector is an apex of a cone formed in space by a light beam emitted from the micro projector.

It can be understood that the relative position between the vertical point of the divergence point of the depth camera on the projection plane and the vertical point of the divergence point of the micro projector on the projection plane is the relative position between the micro projector and the depth camera. After the pixel coordinates of the vertical point of the divergence point of the depth camera on the projection plane are acquired, the pixel coordinates of the vertical point of the divergence point of the micro projector on the projection plane can be obtained based on the relative position.

For example, dx is a distance along the horizontal X axis between the depth camera and the micro projector, and dy is a distance along Y axis between the depth camera and the micro projector. If the pixel coordinates of the vertical point of the divergence point of the depth camera on the projection plane are (x, y), the pixel coordinates of the vertical point of the divergence point of the micro projector on the projection plane are (lateral resolution corresponding to x+dx, vertical resolution corresponding to y+dy).

The second coordinate obtaining subunit 123 is configured to obtain pixel coordinates of four apexes of the projection region based on the pixel coordinates of the vertical point of the divergence point of the micro projector on the projection plane in combination with a relationship between resolution and distance, to calibrate the relative position of the projection region in the depth image. The details of the process may refer to related description of FIG. 18.

Referring to FIG. 10 which illustrates a schematic structural diagram of an image calibration apparatus according to an embodiment of the disclosure. On the basis of FIG. 20, the image calibration apparatus further includes an operation acquisition unit 13, a conversion unit 14 and an execution unit 15.

The operation acquisition unit 13 is configured to acquire an operation of an operator for the depth image and an operation region of the operation in the depth image.

The operation of the operator in the depth image includes a click operation and/or a swipe operation. In a case that the operator performs the click operation in the depth image, coordinates of the click of the click operation in the depth image are obtained. In a case that the operator performs the swipe operation in the depth image, coordinates of a point on an operated object such as a screen touched by the operator at the beginning of the swipe operation and coordinates of a point on the operated object touched by the operator at the end of the swipe operation are obtained.

The conversion unit 14 is configured to convert the operation region in the depth image into an operation region in the projection region based on the relative position of the projection region in the depth image.

The relative position of the projection region in the depth image is obtained; therefore, the operation region in the depth image is converted into the operation region in the projection region based on the relative position after the operation region in the depth image is obtained.

The execution unit 15 is configured to perform the operation of the operator in the operation region within the projection region.

An electronic device is further provided according to an embodiment of the disclosure. The electronic device includes a micro projector, a depth camera and the image calibration apparatus described above. A relative position between the micro projector and the depth camera is fixed, and the image calibration apparatus is configured to calibrate a relative position of the projection region of the micro projector in the depth image of the depth camera. The specific structure and implementation of the image calibration apparatus may refer to the above embodiments about the image calibration apparatus and image calibration method, and the details thereof are not described in detail herein.

It should be noted that, the embodiments of the disclosure are described in a progressive manner, with the emphasis of each of the embodiments on the difference between it and the other embodiments; hence, for the same or similar parts between the embodiments, one can refer to the other embodiments. For an apparatus embodiment, the description is relatively simple since it is substantially similar to the method embodiment, and the related part may refer to parts of the illustration in the method embodiment.

In the embodiments of the disclosure, the disclosed apparatuses and methods may also be implemented in other ways. The above described apparatus embodiments are only illustrated. For example, the division for the units is merely a division of logical functions, and other division manner may be adopted in practice. For example, multiple units or components may be combined, or may be integrated into another system. Some features may be omitted or not performed. In addition, the disclosed components may be coupled, directly coupled or connected to each other via ports, and the devices or units may be indirectly coupled or connected to each other in an electric manner or a mechanical manner or other manners.

The units described as separate components may be or may not be separate physically. The components displayed as units may be or may not be physical units, that is, the components may be located in one place or may be distributed on multiple network units. Part of or all of the units may be chosen based on requirements to achieve the technical solution of the disclosure.

In addition, function units disclosed according to the embodiments of the disclosure may be integrated in one processing unit, or each unit may be separated as one unit, or two or more function units may be integrated in one unit. The integrated unit(s) may be implemented through hardware or through a hardware and software function unit.

It may be understood by those skilled in the art that all or a few of steps for realizing the method embodiment described above may be realized by hardware related to a program instruction, the program described above may be stored a computer-readable storage medium, and the program performs the steps of the method embodiment described above when being executed. The storage medium described above includes various mediums that can store program codes, such as, a mobile storage device, a Read-Only Memory (ROM), a Random Access Memory (RAM), a magnetic disk or an optical disk.

Alternatively, in a case that the integrated unit(s) described above in the disclosure is implemented through the software function unit and is sold and used as an individual product, the individual product may be stored in a computer readable storage medium Base on such understanding, the essence of the technical solution of the disclosure or a part of the disclosure contributing to conventional technologies may be embodied as a software product which is stored in a storage medium and includes multiple instructions for instructing a computer device (which may be a personal computer, a server, network equipment or the like) to perform all of or few of the steps of the methods according to the embodiments of the disclosure. The storage medium described above may include any medium which can store program codes, such as a mobile storage device, a Read-Only Memory (ROM), a Random Access Memory (RAM), a magnetic disk or an optical disk.

The foregoing are only specific embodiments of the disclosure, and the scope of protection of the disclosure is not limited thereto. Any changes or substitutions that may be easily thought by those skilled in the art within the technical scope disclosed by the disclosure should be within the scope of protection of the disclosure. Therefore, the scope of protection of the disclosure should conform to the scope of protection of claims.

What is claimed is:

1. An information processing method, applied to an electronic device, the method comprising:
   acquiring a first resolution P×Q of a first display unit, P and Q being the quantity of horizontal and vertical pixels, respectively, and a second resolution M×N of a second display unit, M and N being the quantity of horizontal and vertical pixels, respectively, wherein first multimedia data is displayed synchronously on the first display unit and the second display unit in a full screen mode, and the first display unit is located in the electronic device;
   acquiring a first operation on the first multimedia data for the second display unit;
   analyzing the first operation to obtain first coordinates $(x_1,y_1)$ of the first operation, wherein the first coordinates of the first operation is coordinates of the first operation in the second display unit;
   transforming the first coordinates $(x_1,y_1)$ of the first operation into second coordinates $(x_2,y_2)$ of the first operation by using $$x_2 = P \times M/x_1$$

$$y_2 = Q \times N/y_1,$$

wherein the second coordinates of the first operation are coordinates of the first operation in the first display unit; and
   performing the first operation based on the second coordinates of the first operation.

2. The information processing method according to claim 1, wherein in a case that the first display unit is rotated by an angle in a horizontal direction, performing the first operation based on the second coordinates of the first operation comprises:
   determining a third transform parameter based on the angle;
   transforming the second coordinates of the first operation by the third transform parameter; and
   performing the first operation based on transformed second coordinates.

3. The information processing method according to claim 1, wherein in a case that the second display unit is located in the electronic device and the electronic device projects the first multimedia data through the second display unit, the electronic device further comprises an image capturing unit, and acquiring a first operation on the first multimedia data for the second display unit and analyzing the first operation to obtain first coordinates of the first operation comprises:
   capturing first information and second information of a target object by the image capturing unit, wherein the first information is two-dimensional plane information of the target object, and the second information is one-dimensional depth information of the target object;
   acquiring information about a display area of the first multimedia data projected; and
   analyzing the first information, the second information and the information about the display area, to obtain position coordinates of the target object in the display area.

4. An information processing method, comprising
   acquiring a first resolution P×Q of a first display unit, P and Q being the quantity of horizontal and vertical pixels, respectively, and a second resolution M×N of a second display unit, M and N being the quantity of horizontal and vertical pixels, respectively, wherein first multimedia data is displayed synchronously on the first display unit in a full screen mode and on the second display unit in a non-full screen mode, and the first display unit is located in an electronic device;
   acquiring a first operation on the first multimedia data for the second display unit;
   analyzing the first operation to obtain first coordinates $(x_1,y_1)$ of the first operation, wherein the first coordinates of the first operation is coordinates of the first operation in the second display unit;

determining a display area of the second display unit for displaying the first multimedia data based on the first resolution and the second resolution, wherein the display area is demarcated by a first boundary point X1 and a second boundary point X2 in a case of a portrait display mode of the second display unit or the display area is demarcated by a first boundary point Y1 and a second boundary point Y2 in a case of a landscape display mode of the second display unit;

judging whether the first coordinates of the first operation is located between the first boundary point and the second boundary point based on the first coordinates of the first operation, to obtain a first judging result; and in a case that the first judging result indicates that the first coordinates of the first operation is located between the first boundary point and the second boundary point, transforming the first coordinates $(x_1,y_1)$ of the first operation into second coordinates $(x_2,y_2)$ of the first operation by using $$x_2=(x_1-X1)\times P/M$$

$$y_2=y_1\times Q/N$$

in the case of the portrait display mode of the second display unit or by using $$x_2=x_1\times P/M$$

$$y_2=(y_1-Y1)\times Q/N$$

in the case of the landscape display mode of the second display unit, wherein the second coordinates of the first operation are coordinates of the first operation in the first display unit; and performing the first operation based on the second coordinates of the first operation.

5. An electronic device, a processor and a non-transitory storage medium having a plurality of instructions stored thereon that, when executed by the processor, cause the processor to acquire a first resolution P×Q of a first display unit, P and Q being the quantity of horizontal and vertical pixels, respectively, and a second resolution M×N of a second display unit, M and N being the quantity of horizontal and vertical pixels, wherein first multimedia data is displayed synchronously on the first display unit and the second display unit in a full screen mode, and the first display unit is located in the electronic device;

acquire a first operation on the first multimedia data for the second display unit;

analyze the first operation to obtain first coordinates $(x_1,y_1)$ of the first operation, wherein the first coordinates of the first operation is coordinates of the first operation in the second display unit;

the first coordinates $(x_1,y_1)$ of the first operation on the first multimedia data into second coordinates $(x_2,y_2)$ of the first operation by using $$x_2=P\times M/x_1$$

$$y_2=Q\times N/y_1,$$

wherein the second coordinates of the first operation are coordinates of the first operation in the first display unit; and perform the first operation based on the second coordinates of the first operation.

* * * * *